(12) United States Patent
Bernstein et al.

(10) Patent No.: US 9,563,851 B2
(45) Date of Patent: Feb. 7, 2017

(54) PROGRAMMABLE PROBABILITY PROCESSING

(75) Inventors: Jeffrey Bernstein, Middleton, MA (US); Benjamin Vigoda, Winchester, MA (US); Kartik Nanda, Cambridge, MA (US); Rishi Chaturvedi, San Diego, CA (US); David Hossack, Somerville, MA (US); William Peet, Somerville, MA (US); Andrew Schweitzer, Cambridge, MA (US); Timothy Caputo, West Newton, MA (US)

(73) Assignee: Analog Devices, Inc., Norwood, MA (US)

( * ) Notice: Subject to any disclaimer, the term of this patent is extended or adjusted under 35 U.S.C. 154(b) by 100 days.

(21) Appl. No.: 13/491,212

(22) Filed: Jun. 7, 2012

(65) Prior Publication Data

US 2012/0317065 A1   Dec. 13, 2012

Related U.S. Application Data

(63) Continuation-in-part of application No. 13/187,466, filed on Jul. 20, 2011.
(Continued)

(51) Int. Cl.
*G06F 17/00* (2006.01)
*G06N 5/02* (2006.01)
(Continued)

(52) U.S. Cl.
CPC ............... *G06N 7/005* (2013.01); *G06N 5/003* (2013.01); *G06N 5/02* (2013.01); *G06N 5/04* (2013.01); *G06N 99/005* (2013.01); *G06Q 30/02* (2013.01)

(58) Field of Classification Search
None
See application file for complete search history.

(56) References Cited

U.S. PATENT DOCUMENTS 5,297,232 A      3/1994  Murphy
5,369,749 A  *  11/1994  Baker ..................... G06F 15/17
                                                             710/1
(Continued)

FOREIGN PATENT DOCUMENTS

CN        10105979 A      10/2007
WO        2012/170679     6/2012

OTHER PUBLICATIONS

Distributed Parallel Inference on Large Factor Graphs Gonzalez et al.*

(Continued)

*Primary Examiner* — Kakali Chaki
*Assistant Examiner* — Ababacar Seck
(74) *Attorney, Agent, or Firm* — Patent Capital Group

(57) ABSTRACT

In an aspect, in general, a programmable computation device performs computations of an inference task specified by a plurality of variables and a plurality of factors, each factor being associated with a subset of the variables. The device includes one or more processing elements. Each processing element includes a first storage for a definition of a factor, a second storage for data associated with the inputs and/or outputs of at least some of the computations, and one or more computation units coupled to the first storage and the second storage for performing a succession of parts of the at least some of the computations that are associated with a factor, the succession of parts defined by data in the storage for the definition of the factor.

26 Claims, 13 Drawing Sheets

Related U.S. Application Data

(60) Provisional application No. 61/494,311, filed on Jun. 7, 2011.

(51) Int. Cl.
  *G06N 7/00* (2006.01)
  *G06N 99/00* (2010.01)
  *G06N 5/00* (2006.01)
  *G06Q 30/02* (2012.01)
  *G06N 5/04* (2006.01)

(56) References Cited

U.S. PATENT DOCUMENTS

| | | | | |
|---|---|---|---|---|
| 5,621,896 | A * | 4/1997 | Burgess | G06F 9/3824 711/118 |
| 6,073,185 | A * | 6/2000 | Meeker | G06F 15/8023 710/1 |
| 7,299,339 | B2 | 11/2007 | Ramesh | |
| 7,580,404 | B2 | 8/2009 | Thiele et al. | |
| 8,458,114 | B2 * | 6/2013 | Vigoda | G06N 7/005 706/52 |
| 8,914,618 | B2 * | 12/2014 | Wang | G06F 9/30181 712/220 |
| 2006/0075206 | A1 * | 4/2006 | Bouchard | G06F 9/30003 711/202 |
| 2010/0161533 | A1 | 6/2010 | Snook et al. | |
| 2010/0223225 | A1 | 9/2010 | Vigoda et al. | |
| 2014/0114443 | A1 | 4/2014 | Bernstein et al. | |

OTHER PUBLICATIONS

Exploiting Fine-Grain Thread Level Parallelism on the MIT Multi-ALU Processor Stephen W. Keckler, William J. Daily, Daniel Maskit, Nicholas P. Carter, Andrew Chang, Whay S. Lee.*
Distributed Parallel Inference on Large Factor Graphs—2009 Gonzalez et al.*
Exploiting Fine-Grain Thread Level Parallelism on the MIT Multi-ALU Processor—1998 Stephen W. Keckler, William J. Daily, Daniel Maskit, Nicholas P. Carter, Andrew Chang, Whay S. Lee.*
U.S. Appl. No. 61/366,061, filed Jul. 20, 2010.
U.S. Appl. No. 61/380,964, filed Sep. 8, 2010.
U.S. Appl. No. 13/187,466, filed Jul. 20, 2011.
Non-Final Office Action in U.S. Appl. No. 13/187,466 mailed Jan. 2, 2014, 23 pages.
Final Office Action in U.S. Appl. No. 13/187,466 mailed Jul. 17, 2014, 24 pages.
Advisory Action in U.S. Appl. No. 13/187,466 mailed Oct. 3, 2014, 3 pages.
PCT Patent Application Serial No. PCT/US2012/041341 filed Jun. 7, 2012.
PCT Search Report and Written Opinion issued for PCT Patent Application Serial No. PCT/US2012/041341 mailed Oct. 16, 2012, 95 pages.
Korean Patent Application Serial No. 10-2014-7000431 filed Jan. 7, 2014 corresponding to International Application PCT/2012/041341 in the English Language.
Bobda, Christophe, and Ali Ahmadinia. "Dynamic interconnection of reconfigurable modules on reconfigurable devices." Design & Test of Computers, IEEE 22.5 (2005): 443-451.
Estrin, Gerald. "Reconfigurable computer origins: the UCLA fixed-plus-variable (F+ V) structure computer." IEEE Annals of the History of Computing 24.4 (2002): 3-9.
Vassiliadis, Stamatis, and Ioannis Sourdis. "Reconfigurable fabric interconnects." System-on-Chip, 2006. International Symposium on. IEEE, 2006.
Kschischang, Frank R. et al., "Factor graphs and the sum-product algorithm", Information Theory, IEEE Transactions on 47.2 (2001): 498-519.
Wymeersch, Henk, Iterative receiver design. Chapers 4 and 5, vol. 234. Cambridge: Cambridge University Press, 2007.
Chu, Cheng et al., "Map-reduce for machine learning on multicore". Advances in neural information processing systems 19 (2007): 281.
Sanders, Peter, "Randomized static load balancing for tree-shaped computations", Workshop on Parallel Processing, 1994.
Gonzalez et al., "Residual splash for optimally parallelizing belief propagation", International Conference on Artificial Intelligence and Statistics, 2009.
Rapley, A. et al., "Stochastic Iterative Decoding on Factor Graphs", Proc. 3rd Int. Symp. Turbo Codes Related Topics 2003.
Lemon, Sumner, "Chip Startup Developing Probability Processor", www.pcworld.com/article.203541/article.html, Aug. 18, 2010, 1 page.
Adar, Rivka et al., "Stochastic Computing With Biomolecular Automata", www.pnas.org/cgi/doi/10.1073/pnas.0400731101, 9960-9965, PNAS, Jul. 6, 2004, vol. 101, No. 27, 6 pages.
Vigoda, Benjamin, "Analog Logic: Programmable, Continuous-Time Analog Circuits for Statistical Signal Processing," http://cba.mit.edu/events/03.09.Vigoda.ppt [online: Sep. 1, 2003) XP007904893.
Gonzalez et al., "Distributed Parallel Inference on Large Factor Graphs," UAI, pp. 203-212 (2009) http://arxiv.org/ftp/arvix/papers/1205/1205.2645.pdf [online: Oct. 5, 2012] ) XP55040184.
Boser et al., "An Analog Neural Network Processor with Programmable Topology," IEEE Journal of Solid-State Circuits, 26(12): 2017-2024 (1991) XP000272863.
Korean Language—1st Office Action issued in Korean Patent Application Serial No. 10-2014-7000431 mailed Jun. 22, 2015, 7 pages.
English Language—Summary of 1$^{st}$ Office Action issued in Korean Patent Application Serial No. 10-2014-7000431 mailed Jun. 22, 2015, 2 pages.
CN OA1 issued in CN Patent Application Serial No. 201280034859.9 mailed Dec. 14, 2015, 8 pages.
English Summary of CN OA1 issued in CN Patent Application Serial No. 201280034859.9 mailed Dec. 14, 2015, 1 page.
Korean Language—2nd Office Action issued in Korean Patent Application Serial No. 10-2014-7000431 mailed Dec. 30, 2015, 8 pages.
Englished Translated—2nd Office Action issued in Korean Patent Application Serial No. 10-2014-7000431 mailed Dec. 30, 2015, 8 pages.
Non-Final Office Action in U.S. Appl. No. 13/187,466 mailed Mar. 11, 2016, 31 pages.
Karypis, George et al., *Parallel Multilevel k-way Partitioning Scheme for Irregular Graphs*, University of Minnesota, Oct. 24, 1996, 21 pages.

* cited by examiner

```
100   for all a do l̤_A(a) ← MAXVALUE ;
101   for all b do l̤_B(b) ← MAXVALUE ;
102   for all c do l̤_C(c) ← MAXVALUE ;
103
104   for i =1,...,‖W‖
105   {
106       l̃_A ← W(a_i,b_i,c_i) + l⃗_B(b_i) + l⃗_C(c_i)
107       l̃_B ← W(a_i,b_i,c_i) + l⃗_A(a_i) + l⃗_C(c_i)
108       l̃_C ← W(a_i,b_i,c_i) + l⃗_A(a_i) + l⃗_B(b_i)
109       l̤_A(a_i) ← min(l̤_A(a_i),l̃_A)
110       l̤_B(b_i) ← min(l̤_B(b_i),l̃_B)
111       l̤_C(c_i) ← min(l̤_C(c_i),l̃_C)
112   }
```

PROGRAMMABLE PROBABILITY PROCESSING

CROSS-REFERENCE TO RELATED APPLICATIONS

This application claims the benefit of the right of priority to U.S. Provisional Application No. 61/494,311, titled "ACCELERATING INFERENCE COMPUTATION," filed Jun. 7, 2011. This application also claims the benefit of, and for U.S. purposes is a continuation-in-part of, U.S. patent application Ser. No. 13/187,466, filed on Jul. 20, 2011. These applications are incorporated herein by reference.

STATEMENT AS TO FEDERALLY SPONSORED RESEARCH

This invention was made with government support under FA8750-07-C-0231 awarded by the Defense Advanced Research Projects Agency (DARPA). The government has certain rights in the invention.

BACKGROUND

This invention relates to programmable probability processing.

One approach to inference-based computation (e.g., Belief Propagation, BP) makes use of factor graphs, for instance, as described in Loeliger, "Introduction to Factor Graphs," IEEE Signal Processing Magazine, January 2004. One graph-based inference approach is the Sum-Products (SP) approach, as described in the referenced paper. Another approach is the Min-Sum (MS) approach (also referred to as Max-Sum or Max-Product), which can be regarded as an approximation of the SP approach. A description of such algorithms may be found in H. Wymeersch, Iterative Receiver Design, Cambridge University Press, Cambridge, 2007.

Referring to FIG. 1, an example of a portion of a factor graph 100 includes factor nodes 110-111 and variable nodes 121-123. Factor node 110 implements a factor (e.g., a constraint) that depends on the variables A, B, and C associated with variable nodes 121-123, respectively. In the SP approach, the factor node 110 receives messages from the adjacent variable nodes, and uses those messages to compute and emit output messages back to the variable nodes. In the SP approach, we use the notation $\vec{\mu}_A$ (or more explicitly $\vec{\mu}_{A \to F}$) to represent the message from the variable node 121 associated with variable A to factor node 110 associated with factor F. Similarly, the message passing back to the variable node is represented as $\overleftarrow{\mu}_A$ (or more explicitly $\overleftarrow{\mu}_{A \leftarrow F}$). For the factor graph shown in FIG. 1, the messages for factor node 110 are computed as follows:

$$\overleftarrow{\mu}_C(c) = \sum_{a,b} w(a,b,c)\vec{\mu}_A(a)\vec{\mu}_B(b) \tag{1a}$$

$$\overleftarrow{\mu}_B(b) = \sum_{a,c} w(a,b,c)\vec{\mu}_A(a)\vec{\mu}_C(c) \tag{1b}$$

$$\overleftarrow{\mu}_A(a) = \sum_{b,c} w(a,b,c)\vec{\mu}_B(b)\vec{\mu}_C(c) \tag{1c}$$

The weights w(a,b,c) represent the factor, for example, as a probability distribution with all the values adding up to 1.0, of as another form of distribution, or as 0/1 indicator values.

In the Max-Product approach, the summations are effectively replaced with max operations. The Min-Sum approach is effectively a logarithmic version of the Max-Product approach. The messages represent logarithmic messages, for instance, defined as $\vec{1}_A \equiv -\log(\vec{\mu}_A)$ (taking the logarithm element-wise). Similarly, the weights are defined as $W(a,b,c) = -\log w(a,b,c)$. For the MS approach, the messages are computed as follows:

$$\overleftarrow{1}_C(c) = \min_{a,b}(W(a,b,c) + \vec{1}_A(a) + \vec{1}_B(b)) \tag{2a}$$

$$\overleftarrow{1}_B(b) = \min_{a,c}(W(a,b,c) + \vec{1}_A(a) + \vec{1}_C(c)) \tag{2b}$$

$$\overleftarrow{1}_A(a) = \min_{b,c}(W(a,b,c) + \vec{1}_B(b) + \vec{1}_C(c)) \tag{2c}$$

In the discussion below, we use the notation |A| to represent the number of values that the variable A can take on. In this notation, the number of terms in the sum for $\overleftarrow{\mu}_C(c)$ is |A|×|B|. For instance, if each variable can take on one of 64 values, there are 4096 terms in the sum or min, which must be computed for each of the 64 output values, for a total of over 0.78 million terms to compute three output messages.

There is a need to accelerate computation of the messages for the purpose of accelerating inference computation, for example, based on factor graphs.

SUMMARY

In an aspect, in general, a programmable computation device performs computations of an inference task specified by a plurality of variables and a plurality of factors, each factor being associated with a subset of the variables. The device includes one or more processing elements. Each processing element includes a first storage for a definition of a factor, a second storage for data associated with the inputs and/or outputs of at least some of the computations, and one or more computation units coupled to the first storage and the second storage for performing a succession of parts of the at least some of the computations that are associated with a factor, the succession of parts defined by data in the storage for the definition of the factor.

Aspects may include one or more of the following features.

Each computation unit may include a combination unit for combining values accessed from the second storage. The combination unit may include numeric computation logic and/or analog computation circuitry. Each computation unit may include an accumulation unit for accumulating an output of the combination unit into values in the second storage. Each processing element may include multiple the computation units. Each of the computation units may have a separate part of the second storage. The first storage may be shared by the computation units.

The device may include a plurality of processing elements operable in parallel, a connectivity system coupled to each of the processing elements, a controller having an interface for a host system for accepting a specification of at least part of the inference task, and being coupled to the processing elements via the connectivity system. Each of the processing elements may be configurable by the controller to perform a computation associated with one of the factors concurrently with other of the processing elements performing computation associated with different ones of the factors. Each of the plurality of processing elements may be coupled to the connectivity system to exchange messages via the connectivity system, the messages providing inputs and/or outputs to the computations associated with the factors and providing to the controller a result of performing of the at least part of the inference task.

The specification of the inference task may include a specification of a graph-based inference task, and each factor may be associated with an element of a graph. The connectivity system may be configurable to provide connectivity between processing elements according to the graph. The connectivity system may provide at least one of a grid, a tree, and a chain connectivity between the processing elements.

In another aspect, in general, a method for performing computations of an inference task uses a processing element of a computation device having a plurality of processing elements. The inference task is specified by a plurality of variables and a plurality of factors, each factor being associated with a subset of the variables. The method includes storing, at a first storage of the processing element, a definition of a factor, storing, at a second storage of the processing element, data associated with the inputs and/or outputs of at least some of the computations, and performing, at one or more combination units of the processing element, a succession of parts of the at least some of the computations that are associated with a factor, the succession of parts defined by data in the first storage. Each of the one or more combination units is coupled to the first storage and the second storage.

Aspects may include one or more of the following features.

Each computation unit may include a combination unit, and performing the succession of parts of the at least some of the computations associated with a factor may include combining values accessed from the second storage. The combination unit may include numeric computation logic used in performing the succession of parts of the at least some of the computations. The combination unit may include analog computation circuitry used in performing the succession of parts of the at least some of the computations. Each computation unit may include an accumulation unit, and performing the succession of parts of the at least some of the computations associated with a factor may include accumulating an output of the combination unit into values in the second storage. Each processing element may include a plurality of the computation units and performing the succession of parts of the at least some of the computations may include performing the parts concurrently on multiple of the computation units.

The method may also include accepting a specification of the inference task. The specification may include a plurality of variables and a plurality of factors with each factor being associated with a subset of the variables. The method may also include configuring each of the processing elements with data defining one or more of the plurality of factors, at each of the processing elements, performing computation associated with one of the factors concurrently with other of the processing elements performing computation associated with different ones of the factors, and exchanging messages via a connectivity system, the messages providing inputs and/or outputs to the processing elements for the computations associated with the factors and providing a result of performing of the at least part of the inference task.

Accepting the specification of the at least part of the inference task may include accepting the specification from a host at a controller of the device, and the method may further include passing the result of the performing of the at least part of the inference task via the controller to the host. The specification of the inference task may include specification of a graph-based inference task, and each factor is associated with an element of a graph. The inference task may include a Belief Propagation task. The messages may represent probability distributions of the variables. Configuring the connectivity system may be to provide connectivity between processing elements according to the graph. Configuring the connectivity system may be according to a result of a computation performed using the device. At least one of a grid, a tree, and a chain connectivity between the processing elements via the connectivity system may be provided.

Finally, it should be understood the programmable computation devices of the type described in this application are not limited for use in computations of an inference task specified by a plurality of variables and a plurality of factors. Acceleration of other similar operations can be implemented with the same, or essentially the same, structure. For example, the sum-product computation (i.e., a linear domain processing of probability values) is effectively a tensor multiplication (a tensor times a bunch of vectors). Therefore, other applications of tensor multiplication, for example, with sparse data representations, can be addressed as well.

Other features and advantages of the invention are apparent from the following description, and from the claims.

DESCRIPTION

1 Overview

Figure 2:
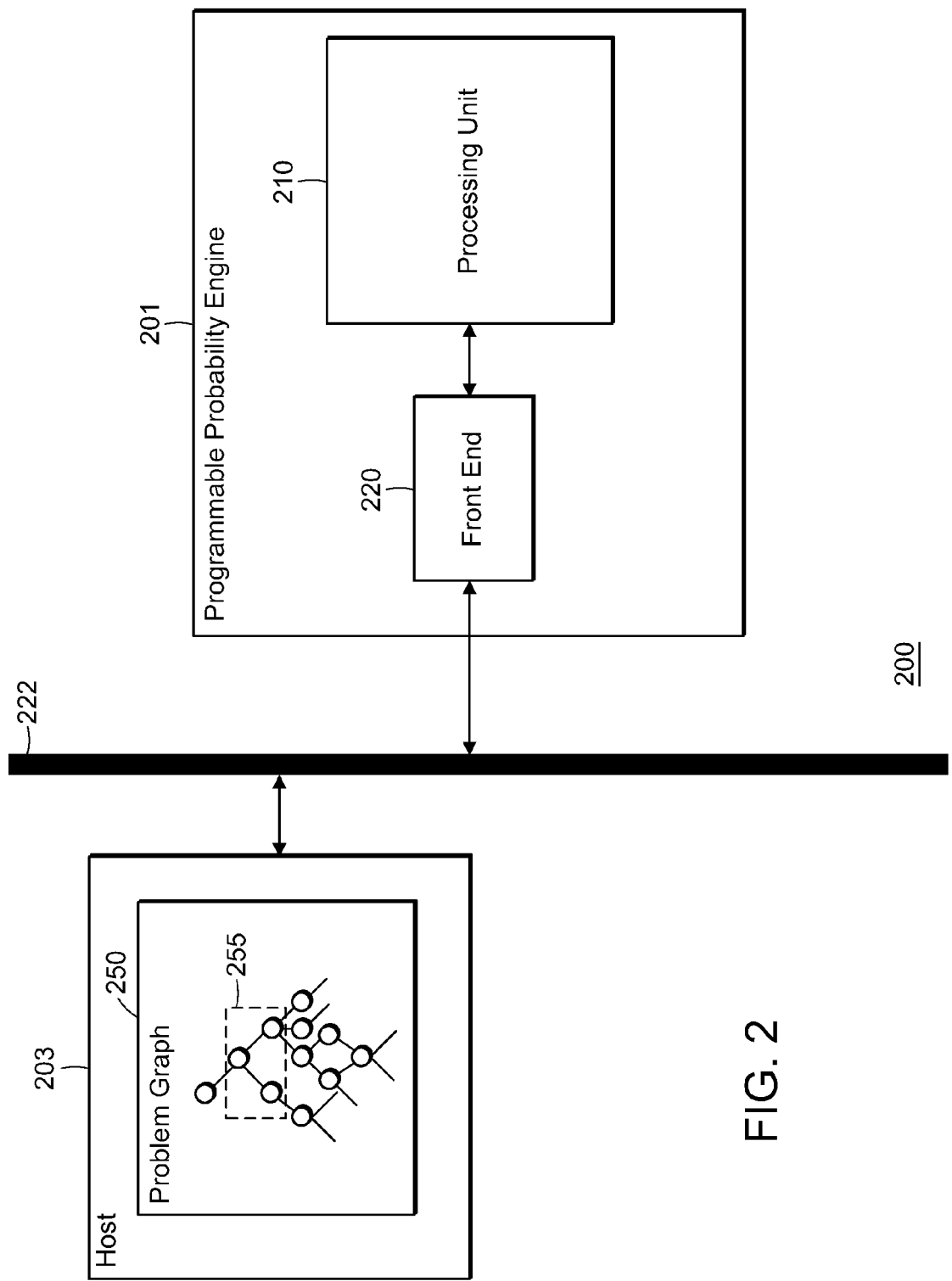
FIG. 2 is a system including a programmable probability engine.

Referring to FIG. 2, a reconfigurable processing system 200 includes a host system 203 (e.g., a conventional digital computer) which is connected via a data bus 222 to a programmable probability engine 201. The programmable probability engine 201 includes a processing unit 210 and a front end (e.g., a digital controller implemented on a field programmable gate array (FPGA)) 220, which is coupled to the bus 222, providing a means of communication between the processing unit 210 and the host system 203.

The probability engine 201 is programmable to implement various types of probability based processing, and in particular, is programmable to implement inference graphs (e.g., factor graphs), for instance to solve Bayesian inference problems. In an example of such a use, a specification of a factor graph 250 is created on the host system 203 and all or part of the graph specification 250 is passed to the probability engine 201 from the host system 203. In some examples, the graph is specified using an approach described in the co-pending application titled "DESIGN AND IMPLEMENTATION OF FACTOR GRAPHS," U.S. patent application Ser. No. 13/006,060, filed Jan. 1, 2011, which is incorporated by reference.

In some examples, the probability engine 201 includes an analog processing unit 210 which is configurable to solve the graph 250, while in other embodiments digital numeric processing is used, or a combination of analog and numeric processing is used. It should also be understood that the graph 250 is not necessarily implemented and operated on as a whole by the processing unit 210. Rather, depending on the configuration of the processing unit 210, various portions (e.g., portion 255) of the graph 250 can be processed at different times and/or on different subsets of the processing unit 210 as is described in a later section.

2 Single Probability Processor Element

Figure 3:
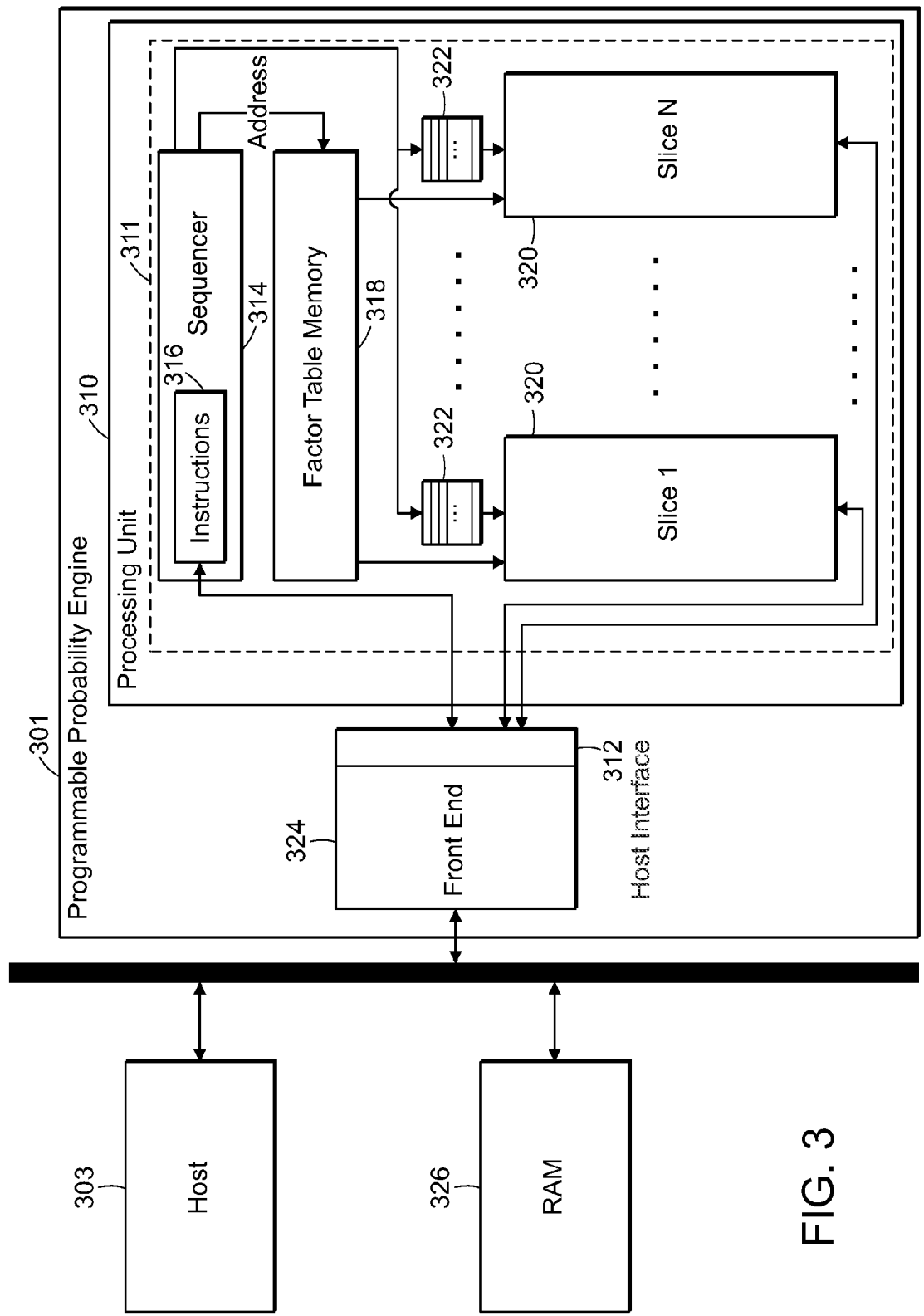
FIG. 3 is a system including a single probability processor element.

Referring to FIG. 3, one embodiment of a reconfigurable processing system 300 includes a processing unit 310 which includes a single probability processor element 311. In general, the probability processor element 311 is a special purpose processor specifically designed to perform computation for the Min-Sum or Sum-Product algorithm on individual factors in a factor graph. The probability processor element 311 is programmable in that it can perform this computation for an arbitrary factor over discrete variables.

The probability processor element 311 includes a sequencer 314 including an instruction memory 316, a factor table memory 318, N computation units (referred to herein as slices) 320, and N first-in-first-out (FIFO) micro-instruction queues 322 each corresponding to one of the N slices 320.

Figure 1:
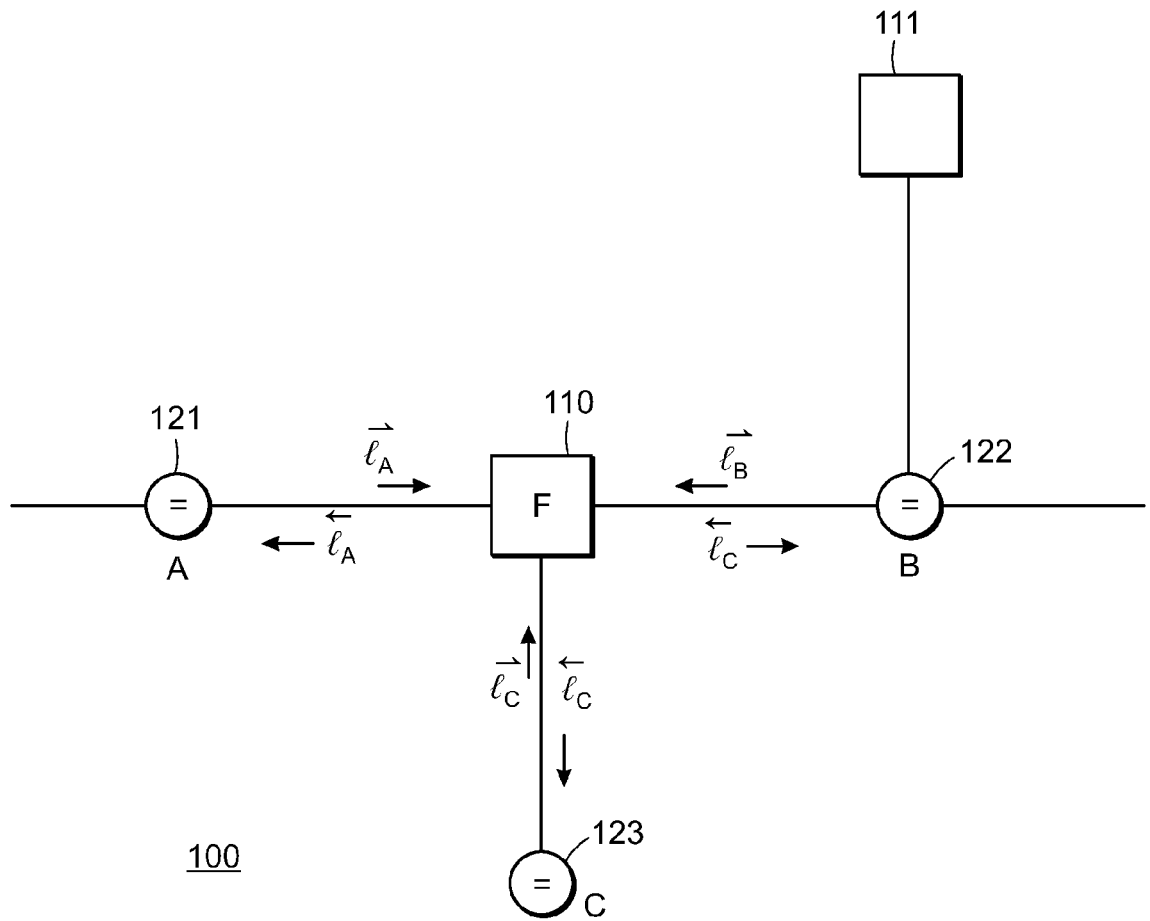
FIG. 1 is a portion of a factor graph.

In general, the host system 303 analyzes a problem graph (as shown in FIG. 1, element 250) and determines a sequence of computations which are necessary to compute the problem graph as well as necessary factor table records. The analysis can be accomplished, for example, by using an application programming interface (API) and a compiler designed specifically for the programmable probability engine 301. Based on the determined sequence of computations, the host system 303 transfers high level instructions into a RAM 326 along with the necessary factor table records if not already resident (e.g., from an earlier computation or from another prior configuration). The front end 324 reads the high level instructions from the RAM 326 using direct memory access (DMA) and provides them to the processing unit 310 via a host interface 312. The front end 324 also reads the factor table records from the RAM 326 and provides them to the processing unit 310 via the host interface 312.

The factor table records accepted from the host interface 312 are provided to the factor table memory 381. The high level instructions accepted from the host interface 312 are provided to the instruction memory 316 in the sequencer 314. The sequencer 314 fetches the high level instructions from the instruction memory 316 and parses them into micro-instructions which are provided to a local instruction sequencer associated with each of the N slices 320. In some embodiments, the local sequencer also provides memory addresses of records to the factor memory 318. The records at the provided memory addresses are fetched from the factor memory 318 and provided to the appropriate slice 320.

Collectively, the slices 320 perform belief propagation for one factor of a factor graph by performing message passing algorithms such as the Min-Sum, Sum-Product, and Mean-Field algorithms. In some examples, a single shared instruction sequencer 314 causes the slices 320 perform message passing algorithms while operating in lock step with one another, with each slice 320 operating on distinct data. In other examples, each slice 320 has its own instruction sequencer 314 along with its own instruction memory 316. In such a case, the slices 320 may operate more independently of each other, for example, synchronizing with each other for inter-slice communications. A detailed description of how a single slice 320 performs a message passing algorithm is presented below. The results produced by the slices 320 are provided to the host interface 312 which in turn provides the results to the host system 303 via the front end 324.

In some examples, the factor table memory 318 maintains a cache of records such that previously used records do not need to be reloaded from the host system 303. The cache of records can be maintained as long as adequate space exists in the factor table memory 318.

2.1 Slice Architecture

Figures 4, 5:
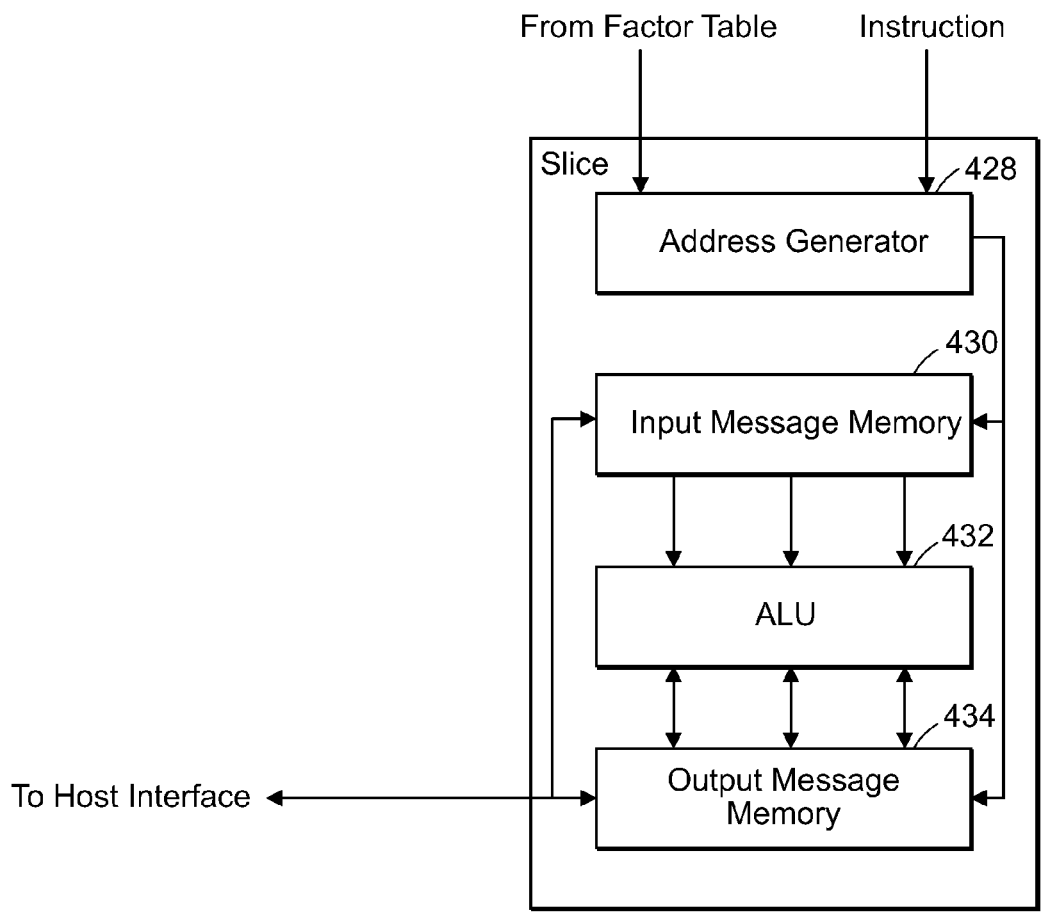
FIG. 4 is a detailed view of a slice.
FIG. 5 is a pseudocode listing.

Referring to FIG. 4, one example of an architecture of a single slice 420 is designed to compute the terms of message computations. The slice 420 includes an address generator 428, an input message memory 430, an ALU 432, and an output message memory 434.

In general, the slice 420 receives an instruction from the FIFO micro instruction queue (shown in FIG. 3, element 322) along with a record from the factor table memory (shown in FIG. 3, element 318). The address generator 428 provides a mapping between values in the factor memory 318 and locations in the input and output message memories 430, 434.

The input and output message memories 430, 434 store the inputs, intermediate values, and output of the computation of belief-propagations messages. Messages stored in the input message memory 430 are passed into the ALU 432 along with messages stored in the output message memory 434. The ALU 432 applies an algorithm (e.g., the Min-Sum algorithm) to the messages and produces a result which is stored in the output message memory 434. After performing a number of iterations of the message passing algorithm, the results stored in the output message memory 434 are passed back to the host system (shown in FIG. 3, element 303) through the host interface (shown in FIG. 3, element 312).

In some examples, the input and output message memories 430, 434 use digital logic. In other examples, the memories 430, 434 use store values in analog form.

Referring to FIG. 5, pseudocode is presented which implements an iterative message passing algorithm that solves for the factor F shown in FIG. 1. The pseudocode can be implemented by the detailed slice architecture shown in FIG. 6.

2.2 Detailed Slice Architecture

Figure 6:
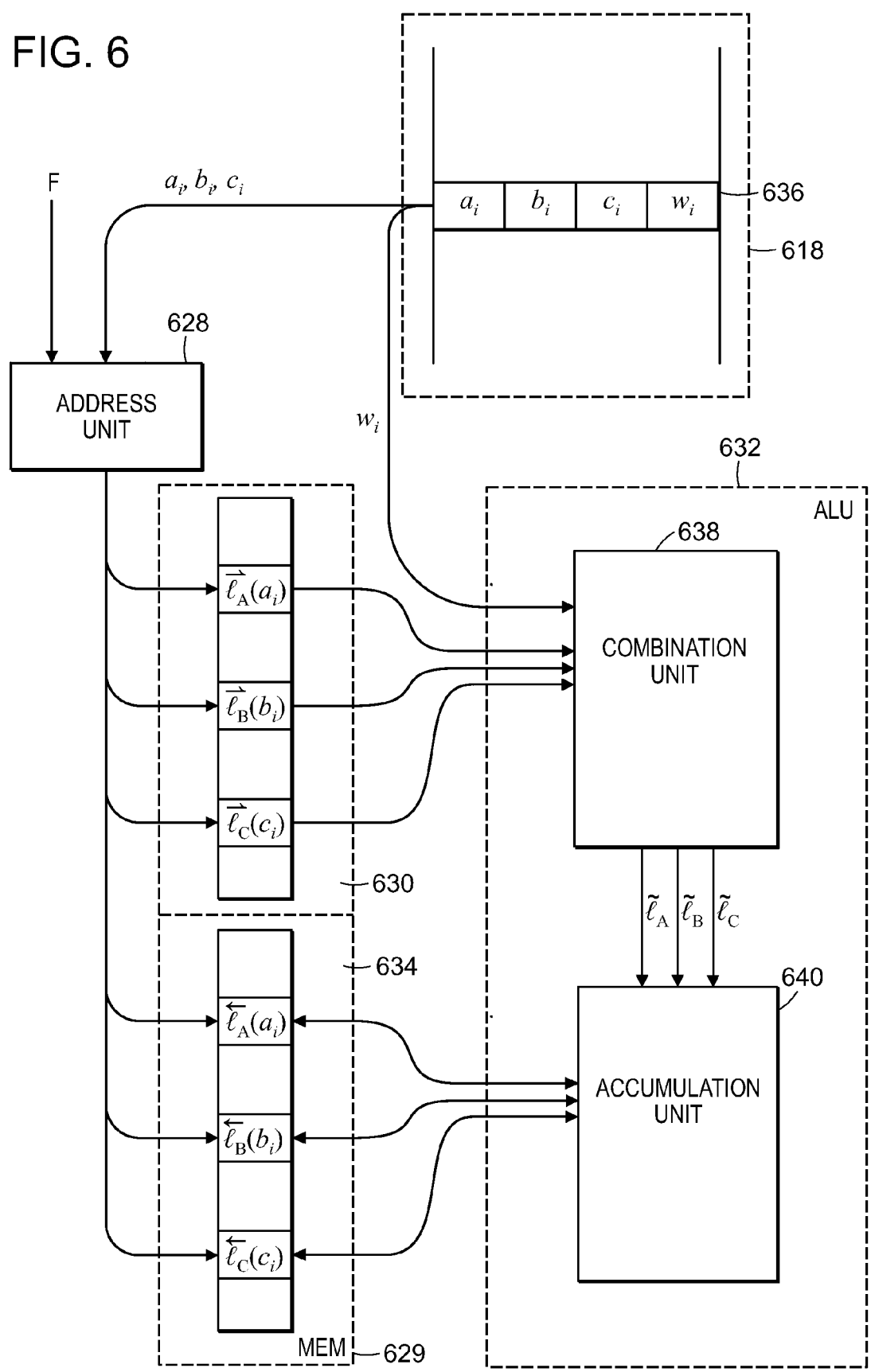
FIG. 6 is a block diagram of a computation unit.

Referring to FIG. 6, a detailed version of the slice architecture shown in FIG. 4 is shown along with the factor table memory 618. The slice architecture includes input and output message memories 630, 634, and an ALU 632. An address unit 628 provides a mapping between values in the factor table memory 618 and locations in the message memories 630, 634. Generally, the factor table memory 618 includes a set of records 636. Each record 636 corresponds to an iteration of the loop over i at lines 104-112 in the pseudocode. A sequencer or controller (not shown in FIG. 6) causes successive records 636 to be accessed from the factor table memory 618. For each record 636, a combination unit 638 of the ALU 632 performs the computations of lines 106-108 of the pseudocode, and an accumulation unit 640 performs the computations of lines 109-111 of the pseudocode. The address unit 628 maps each index into two corresponding memory locations in the message memory: an input message location and an output message location. For example, for the factor F shown in FIG. 1, the address unit 628 maps an index $a_i$ to the address $addr(\vec{I}_A(a_i))$ for the input message and $addr(\vec{\tilde{I}}_A(a_i))$ for the output message (where addr( ) is understood to mean the address of the storage location for that message value). Note that the signal paths between the message memory 629 and the combination unit 638 are unidirectional from the memory to the combination unit 638, while the signal paths between the memory 629 and the accumulation unit 640 are bidirectional so that for each record 636 of the factor table memory 618, the current values of the output messages are read in, and the minimum of the read value and the newly computed value is written back. By iterating over all the elements $(a_i,b_i,c_i)$ of the factor, the three output messages are computed.

2.2.1 Arithmetic Logic Unit

Figure 7:
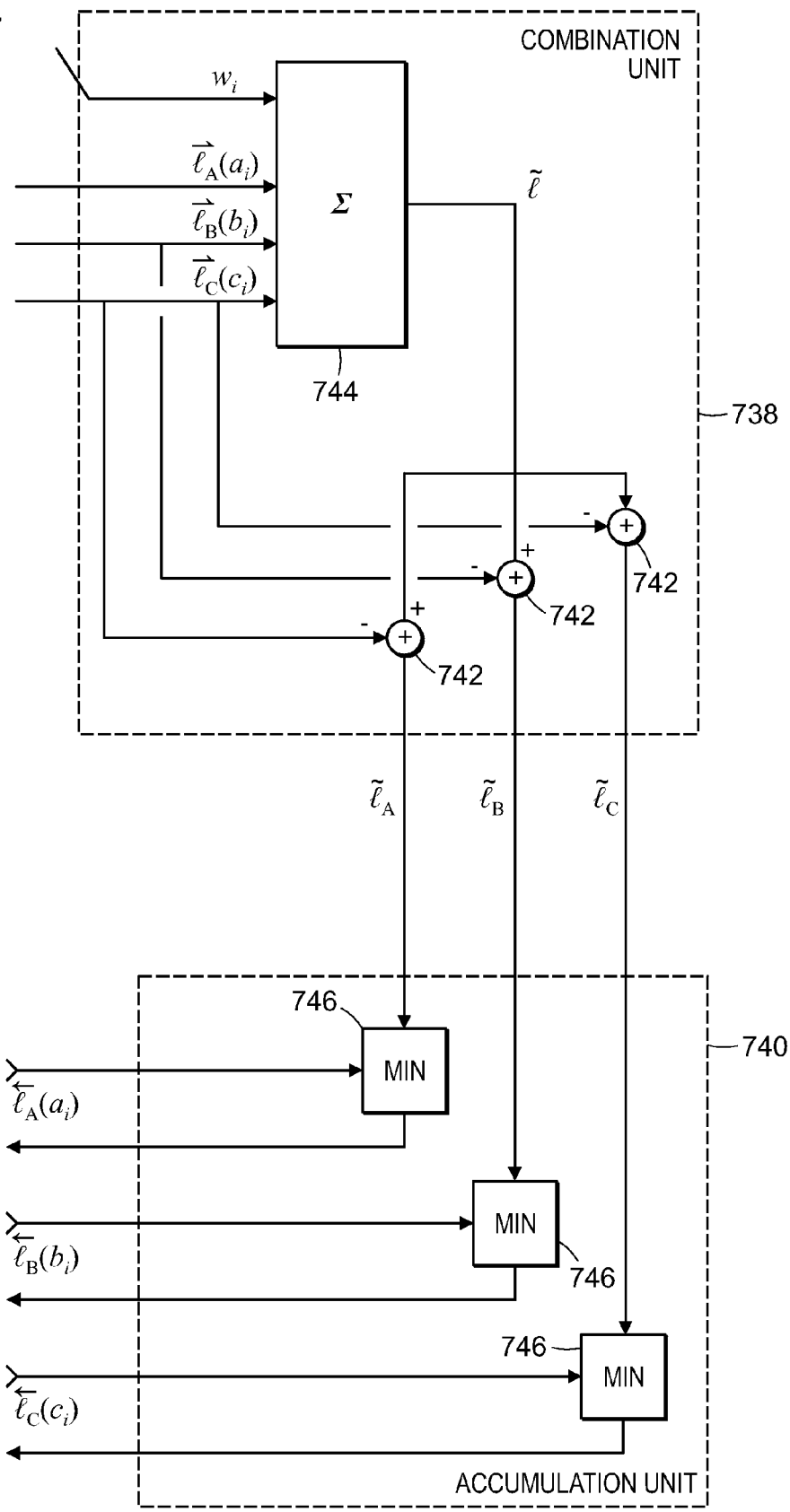
FIG. 7 is a block diagram of an ALU.

Referring to FIG. 7, an implementation of the ALU includes a summation unit 744, which accepts the input message values and the weight and outputs the sum of its inputs. Each of the weights is subtracted in a corresponding adder 742 so that each of the three outputs of the combination unit effectively excludes a corresponding message input. The accumulation unit makes use of three minimum units 746, each of which accepts the memory value and provides the minimum of the memory value and the corresponding newly computed value.

Figure 8:
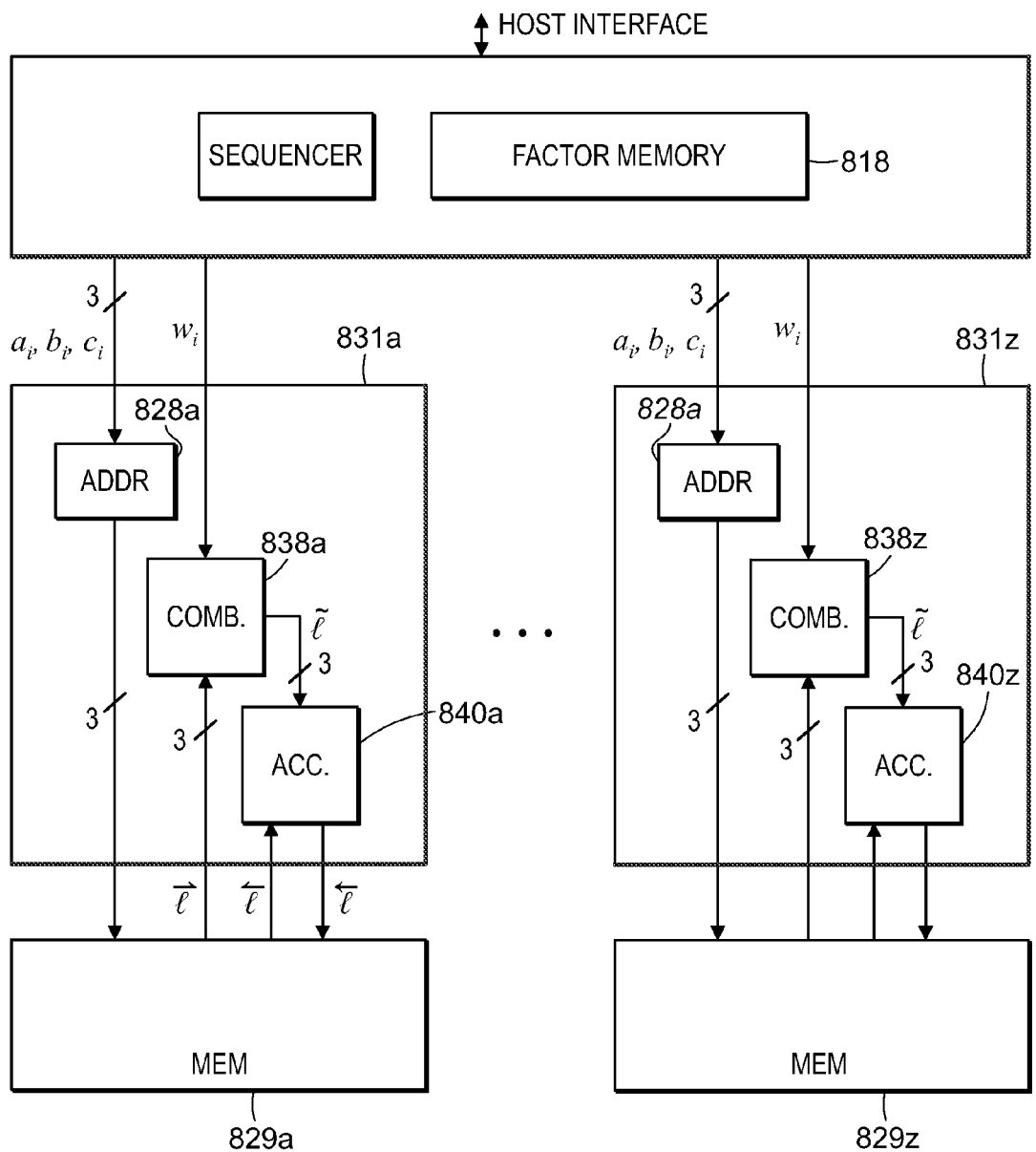
FIG. 8 is a diagram showing multiple ALUs in parallel.

Referring to FIG. 8, in some implementations, multiple ALUs are implemented and executed in parallel. For instance ALUs 831a-831z (i.e., two or more ALUs) each receive a part of (i.e., a disjoint exhaustive subset) the values $(a_i,b_i,c_i)$ for the factor. The input message values are replicated in each copy of the memory 829a-829z so that each ALU can perform a local read of the input message value. After all the elements of the factor are evaluated, the output messages are typically not fully computed. For example, for a particular entry $a_i$, separate partial computations of the output message $\tilde{I}_A(a_i)$ are present in the message memories 829a-z. In one implementation further data paths (not shown) link the accumulation units to the message memory so that in a sequence of iterations (e.g., $\log_2(n)$ where n is the number of ALUs), the absolute minimum is computed across the ALUs.

In some embodiments, a host system controls the operation of the system, including loading the factor memory 818, configuring the sequencer to coordinate operation of the ALUs and the address units, and loading an unloading message values from the message memory.

In some examples, the factor memory 818 does not necessarily hold an exhaustive set of tuples $(a_i, b_i, c_i, w_i)$. For example, a set of tuples $(a_i,b_i,c_i)$ for which a fixed known weight (e.g., 0.0) is encoded, and the sequencer is configured to convert the encoding to the sequence of $(a_i, b_i, c_i, w_i)$ tuples. Other forms of compressed representation of the factors may also be used.

In some examples, different inputs have different numbers of possible values, and therefore different numbers of bits may be needed to represent the indexes. As an example, a variable that can take on 16 values only requires at most 4 bits to represent each index, but a variable that can take on 1024 values may take 10 bits. Therefore, even with a maximum of three variables per record in the factor memory, different numbers of bits may be allocated for each index.

In the example above, the factor is assumed to have three inputs, which corresponds to the hardware architecture of the ALUs which expect three inputs and a weight. For a factor with only two inputs, one approach is to configure the combination unit to ignore one of the inputs, or alternatively for the message memory to provide an input (e.g., 0.0) that does not affect the combination.

Figure 9A:
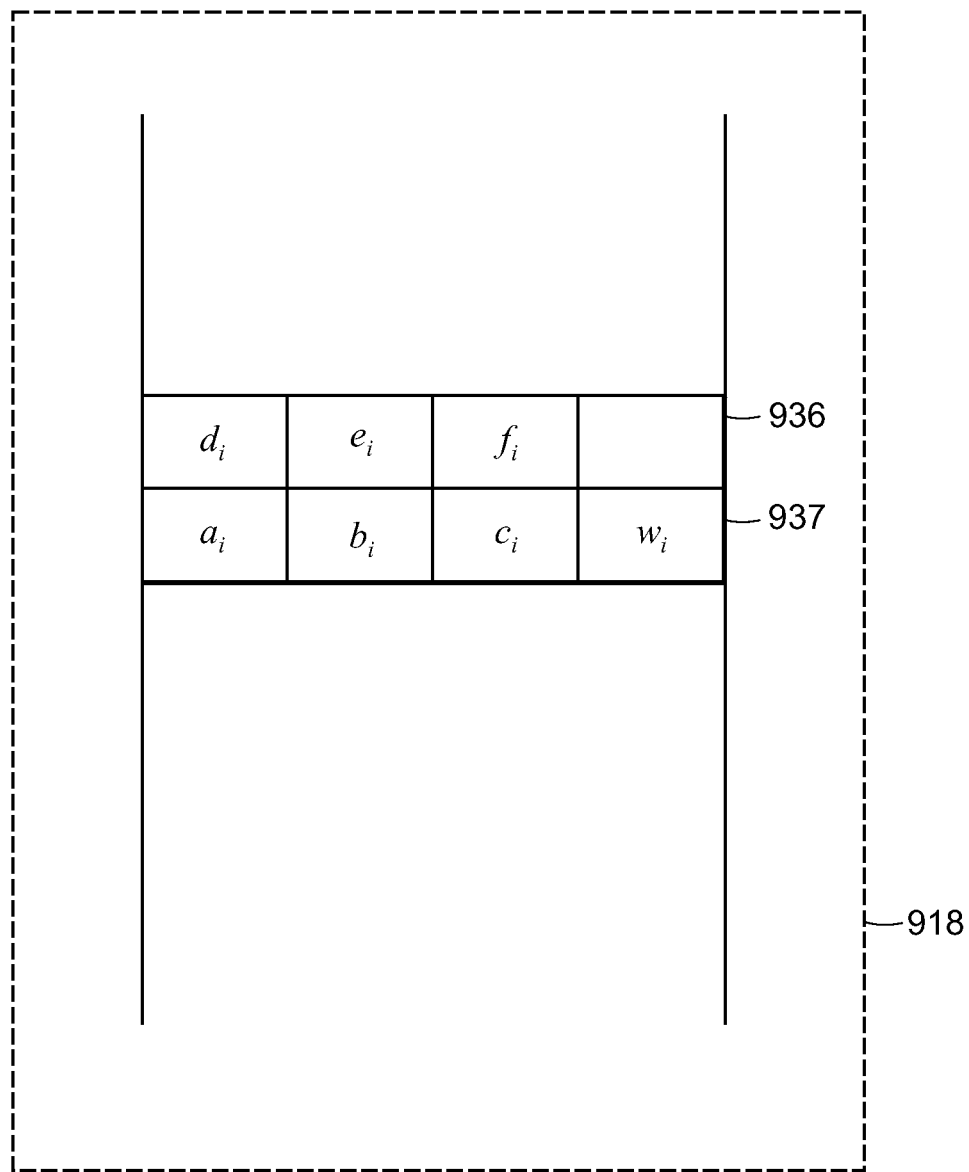
FIG. 9A is a diagram of a factor memory with multiple records per factor element.
Figure 9B:
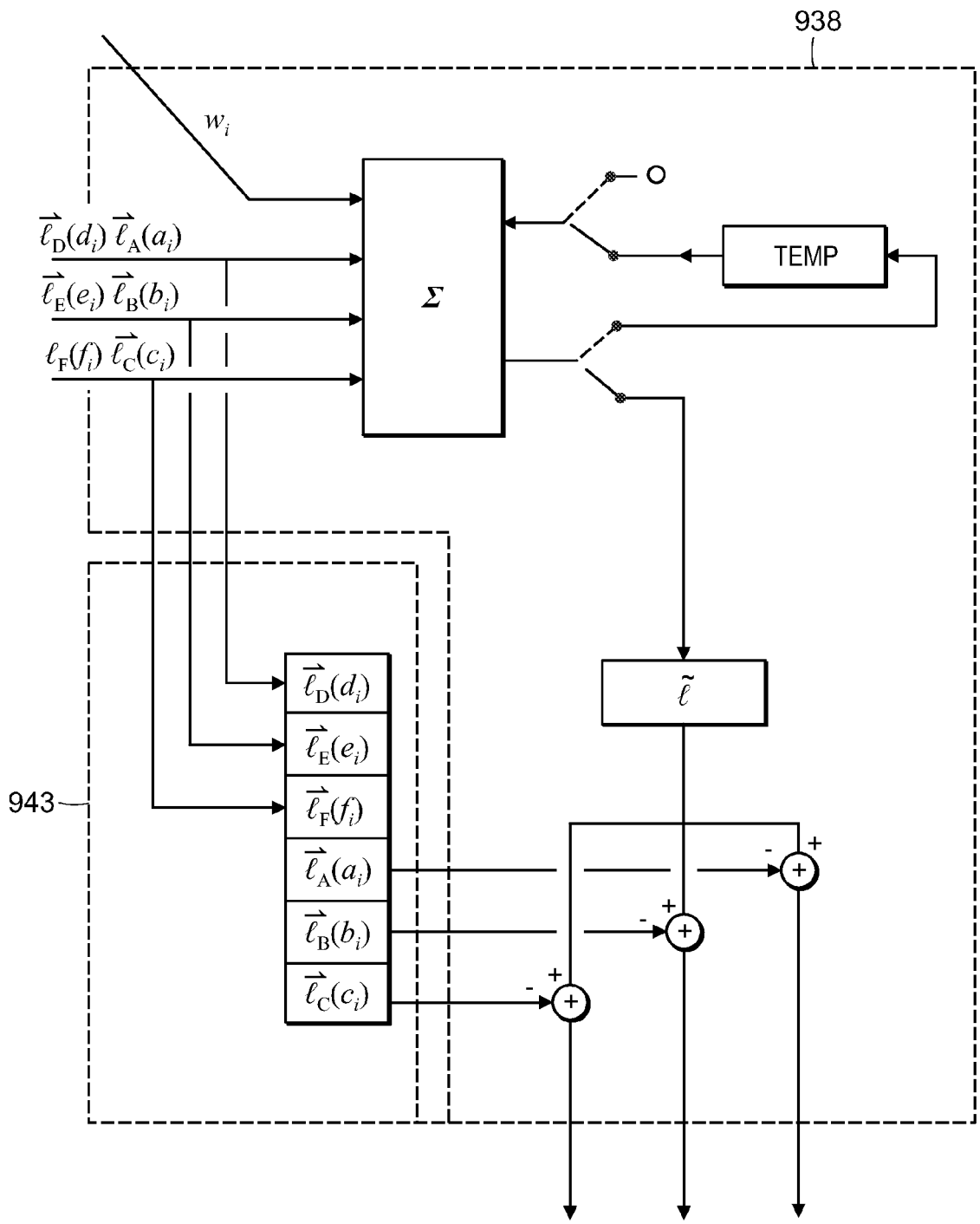
FIG. 9B is a block diagram of an iterative/pipelined ALU.

However when a factor has more inputs than the number for which the ALU is configured, one approach is to use an iterative and pipelined approach. For example, consider a factor that has six variables, and therefore each element of the factor is defined by a tuple $(a_i, b_i, \ldots, f_i, w_i)$. Referring to FIG. 9A, one approach is to encode such an element in a succession of records 936, 937 in the factor memory 918. Referring to FIG. 9B, operation of the combination unit 938 can be understood by considering the first cycle in which $(\vec{I}_A(a_i), \vec{I}_B(b_i), \vec{I}_C(c_i))$ are read from the message memory. These values are summed with the weight $w_i$ and stored (i.e., added to a zeroed value) in a temporary register. The input message values are added to a FIFO. On the second cycle, values $(\vec{I}_D(d_i), \vec{I}_E(e_i), \vec{I}_F(f_i))$ are read from the message memory. The values are then added to the value in the temporary register to yield the value $\tilde{I}$ as defined in the single cycle case. The values $(\vec{I}_D(d_i), \vec{I}_E(e_i), \vec{I}_F(f_i))$ are pushed into the FIFO 943. In the second cycle, the values $(\vec{I}_A(a_i), \vec{I}_B(b_i), \vec{I}_C(c_i))$ are read from the output of the FIFO and subtracted from $\tilde{I}$ to produce $(\tilde{I}_A, \tilde{I}_B, \tilde{I}_B)$. On the third cycle the values $(\vec{I}_D(d_i), \vec{I}_E(e_i), \vec{I}_F(f_i))$ are read from the FIFO and the values $(\tilde{I}_D, \tilde{I}_E, \tilde{I}_F)$ are output by the combination unit. Note that in the third cycle, values $(\vec{I}_A(a_{i+1}), \vec{I}_B(b_{i+1}), \vec{I}_C(c_{i+1}))$ can be processed in a pipelined manner without affecting the outputs $(\tilde{I}_D, \tilde{I}_E, \tilde{I}_F)$.

Operation of the accumulation unit is delayed so that in the second cycle, the output messages for $((a_i, b_i, c_i)$ are updated, and in the third cycle the output messages for $(d_i, e_i, f_i)$ are updated.

Note that this same approach can be used for situations in which more than two records per factor element. Generally, for M records per element, the accumulation unit is delayed by M−1 cycles in a pipelined manner.

3 Multiple Probability Processor Elements

In some examples, a control graph 280 can be a specification of another inference graph which is used to optimally determine how the inference graph 250 is computed by the processing unit 210.

Figure 10:
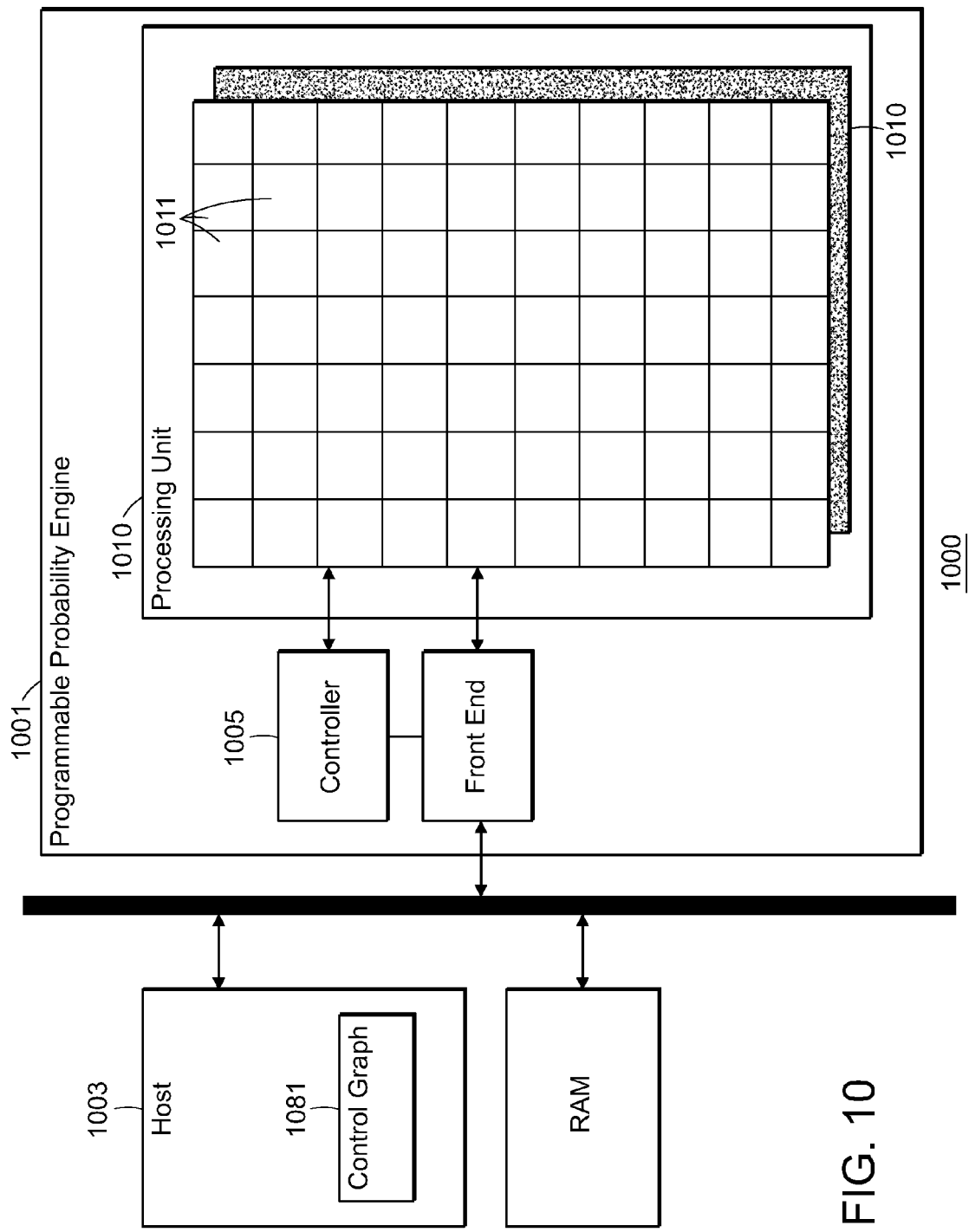
FIG. 10 is a system including multiple probability processor elements.

Referring to FIG. 10, in another embodiment of a reconfigurable processing system 1000, the architecture of the processing unit 1010 is extended to incorporate multiple probability processor elements 1011, with each probability processor element 1011 operating in parallel. The probability processor elements 1011 are connected via a reconfigurable connectivity fabric 1080 over which messages are passed between the data memories of individual probability processor elements 1011. When computing a graphical-model, the set of probability processor elements 1011 operates on a portion of the model at a time (assuming a large model). At any given time, each probability processor element 1011 performs the computation associated with one node in the graph. Each probability processor element 1011 can be used to perform the computation for a number of different nodes as different portions of the model are loaded into the programmable probability engine 1001.

3.1 Interconnect

The connectivity fabric 1080 is configured (e.g., by the host system 1003 or a controller 1005 located on the programmable probability engine 1001) to correspond directly to the structure of the graphical model. For example, in an image processing application, graphical models typically correspond to a two-dimensional grid, or perhaps a hierarchy of such grids. For this type of processing, the connectivity fabric 1080 is configured to mimic this structure so that communication between probability processor elements 1011 corresponds directly to the communication between nodes in the graphical model required for message-passing based inference algorithms. Such a configuration allows for high-bandwidth parallel communication between the probability processor elements 1011 without bottlenecks.

Note that for a given connectivity structure, there may be many distinct inference problems that can be implemented. For example, a linear chain structure can be used to perform inference on a great many models in the form of a time-sequenced Markov model. Or, a hierarchy of two-dimensional grids can be used to perform inference for a wide variety of image processing models.

Some common configurations of the connectivity fabric 1080 are: butterfly network, fully connected, grids, chains, trees, fat trees etc. In some examples, the configurable interconnect plane 1080 includes storage for intermediate analog or digital values.

For some types of graphical models, the connectivity fabric may change frequently when operating on different portions of the graph. For other types of graphical models, such as those representing arrays of image pixels or hidden Markov models, the connectivity may not need to change when operating on different portions of the graph.

In some examples, the processors associated with nodes for which the connectivity changes must complete their processing task and synchronize their data prior to the reconfiguration of connectivity.

In some examples, due to the overhead of reconfiguring the connectivity fabric 980, it may be necessary to allow changes in connectivity to be preloaded while the previous computation is still underway, allowing a rapid switch to the new configuration.

In some examples, operation of the parallel probability processor elements 1011 is a mixture of asynchronous and synchronous operation. Thus, reconfiguration of the connectivity fabric 1080 needs to be synchronized. In particular, all processing elements 1011 involved with the portions of the connectivity fabric 1080 being modified need to reach an appropriate synchronization point before the reconfiguration can occur.

3.2 Tiled Probability Processor Element Architecture

Generally, the processing unit 1010 may have different sets of probability processor elements 1011, each with different characteristics most suited to different types or topologies of factor graphs. For example, one type of probability processor element 1011 may be best suited to graphs that are generally grid-like, while another type of probability processor element 1011 may be best suited for tree-like graphs. In some examples, certain of the probability processor elements 1011 may be particularly tailored to specific types of problems. An example of such a specific problem relates to LDPC decoding as described in the co-pending application international application number PCT/US11/20794 titled "Belief Propagation Processor." In some examples, the probability processor elements 1011 use log-based representations and implement factor graph message passing. In some examples, certain of the probability processor elements 1011 may be implemented using digital logic, while others of the probability processor elements 1011 may be implemented using analog logic.

3.3 Execution Control

As is common in many parallel systems, it is desirable to ensure that each of the processing elements 1011 is optimally utilized. Controlling execution by scheduling, load balancing, and pipelining are ways in which such an optimization can be accomplished.

In some examples, an overall problem graph may have different parts or regions which are not necessarily addressed concurrently. In some such examples, the controller 1005 or host system 1003 follows a predetermined plan or schedule, for example, performing computation using a first part of a graph, and proceeding to another part of the graph only after an intermediate result is obtained. The sequence of iterations results in a convergence to an overall solution of the problem. For example, one part of a graph represent decoding constraints of an LDPC code, while another part of the graph may represent another form or constraint, for instance, based on inter-symbol interference not addressed by the code, and yet another part of the graph may related to adaptation of a channel model to be used in signal acquisition stage. The plan or schedule is then used to coordinate operation of the parts. In some examples, the control is implemented using programmable logic (e.g., a software program), which may involve numerical computations.

The type of schedule is chosen by the user and defined in the source code that specifies a graphical model (or a default schedule is used). Design software (e.g., DMPL software and compiler) combines the graphical model connectivity with a choice of schedule to indicate the specific order of processing. Since the processing unit 1010 allows parallel processing such that many nodes in the graph may be updated at once, instead of generating a single ordered sequence, the DMPL compiler can define a partially ordered sequence of updates, allowing as many updates as possible to be done in parallel. The choice of schedule type, under the control of the user, affects how much parallelism can be exploited.

For a given schedule, each processing operation must be mapped to a given probability processor element 1011 at a given time. This mapping is also a function of the DMPL compiler. The compiler incorporates knowledge of the number of probability processor elements 1011, the available configurations of the connectivity plane, the amount of local and shared storage, and other factors, to choose the mapping. The mapping determines the sequence of instructions provided to each probability processor element 1011, the sequence that these instructions, as well as the combo tables are preloaded onto the probability processor elements 1011, the necessary connectivity plane configuration changes, and the sequence in which data is transferred to and from the probability processor elements 1011. The mapping is explicitly aware of the caching that can be done, avoiding unnecessary transfers of data.

In some examples, efficiency can be improved by using dynamically updating schedules. For example, the host system 1003 or the controller 1005 may optimally select portions of the graph to assign to different probability processor elements 1011. Intermediate values computed for one portion of a graph can be used as indications of which portions of the graph should be solved next such that optimal progress is made toward the overall solution. In other examples, run-time decision making related to which parts of a graph to address during the course of execution is accomplished using a further graph-based computation which is performed by a controller 1005 located on the programmable probability engine 1001. For instance, a decision of which part of a graph to address may itself be represented as a Bayesian inference control problem 1081 which is assigned to the probability processor elements 1011 under the control of the controller 1005.

Another method for optimally utilizing the probability processor elements 1011 is balancing the computational load on each probability processor element 1011. For example, in an arbitrary factor graph there can be a large disparity in the computational complexity between various nodes. As a result, some probability processor elements 1011 may be given a number of factors with small computation required, while other factors may be given a single factor requiring a large computation. The host system can optimally assign factors to computation elements while taking into account the need to balance the load as much as possible.

Another method for optimizing the utilization of the probability processor elements 1011 is to allow the host system 1003 to treat the processing as a pipeline, where at any given time tasks are being fetched ahead of time, fed to the probability processor elements 1011, other tasks are being executed, and the results of already executed tasks are being read out.

3.4 Programming Language/Compiler

In some examples, inference graphs are specified using an application programming interface (API) referred to as DMPL. DMPL is used to design arbitrary graphical models by specifying variables of the model and the factors that relate the variables.

DMPL allows for the specification of the solver schedule which can be a pre-defined schedule (e.g., Sum-Product, Min-Sum, Gibbs sampling, etc.) or a custom, user-defined schedule.

Some pre-defined schedules are conditional on the topology of the inference graph. For example, a tree/sequential schedule examines each graph and sub-graph to determine which schedule to use for it. If the graph or sub-graph is a tree, then a tree schedule is used for that portion of the graph (the optimal schedule for a tree), otherwise a sequential schedule is used for that portion of the graph.

Once the inference graph is specified, DMPL compiles the factor graph such that the programmable probability engine 1001 can execute them. The output of the compiler includes control software for the host system 1003 and data/sequencing instructions for the programmable probability engine 1001.

4 Alternatives

It should be understood that although a number of embodiments described above make use of the Min-Sum approach, in which a negative logarithm representation permits effectively compute products as sums, effectively the same approach can implement the Sum-Product approach, in which a linear probability representation is used, by implement products rather than sum, and sums rather than mins. Furthermore, a variety of similar approaches can be addressed with this architecture.

Furthermore, a number of features may be optionally added to replace corresponding features in embodiments that otherwise follow the approaches described above. Such features include the following.

4.1 Factor Table Organization and Compression

In the architectures described above, each factor in a factor graph has an associated factor table that drives the computation. As introduced above, a variety of encoding formats of the factor table can be used in the factor memory, each enabling generation of the appropriate sequence of memory addresses and factor weights needed to compute the entries of the output message. Embodiments of the system may be configured to access different encoding formats, or may be configured to operate with a particular format. A number these formats are described below.

For the sake of exposition, assume that there are K inputs to the factor, such that the index for a factor can be considered to be a K dimensional vector with its $j^{th}$ entry having possible values 1 to $n_j$. There are therefore $N=\Pi_j n_j$ unique index vectors. Each index vector $X_i$ is associated with a weight $w_i$.

As introduced above, a first format for the factor memory is as a sequence of records, each encoding $(X_i, w_i)$. We refer to this format as an explicitly indexed factor table. Note that fewer than N records can be represented in the factor table, with missing index values essentially having zero weights (in the linear domain). In some examples, the encoding of the index vector uses a fixed-length format, for example, allocating $\lceil \log_2 n_j \rceil$ bits for the $j^{th}$ entry of the index vector.

Another format for a factor table includes a weight for all possible index values. We refer to such a table as an exhaustive factor table. With only the weights being represented in the factor table, the index values and corresponding addresses are generated by the address generator, for example, according to a canonical ordering of the weights.

One canonical ordering of the weights starts with $X_1=(1, 1, 1)$, $X_2=(2, 1, 1)$ incrementing the entries in order. Note that this order results in transitions of multiple index values at times, for example from $(n_1, 1, 1)$ to $(1, 2, 1)$ or from $(n_1, n_2, 1)$ to $(1, 1, 2)$, In such transitions, multiple read accesses are required to access each of the input and output message memories.

An alternative canonical ordering for the weights is based on a generalization of a Gray Code, in which the sequence of index vectors is guaranteed to change only a single entry at a time. For example, such a sequence may progress $(1,1,1), (2,1,1), \ldots (n_1,1,1), (n_1,2,1), (n_1-1,2,1), \ldots (1,2,1), (1,3,1), (2,3,1)$ and so forth. Using such a canonical ordering, only one new input and one new output message is referenced for each new weight.

Figure 11:
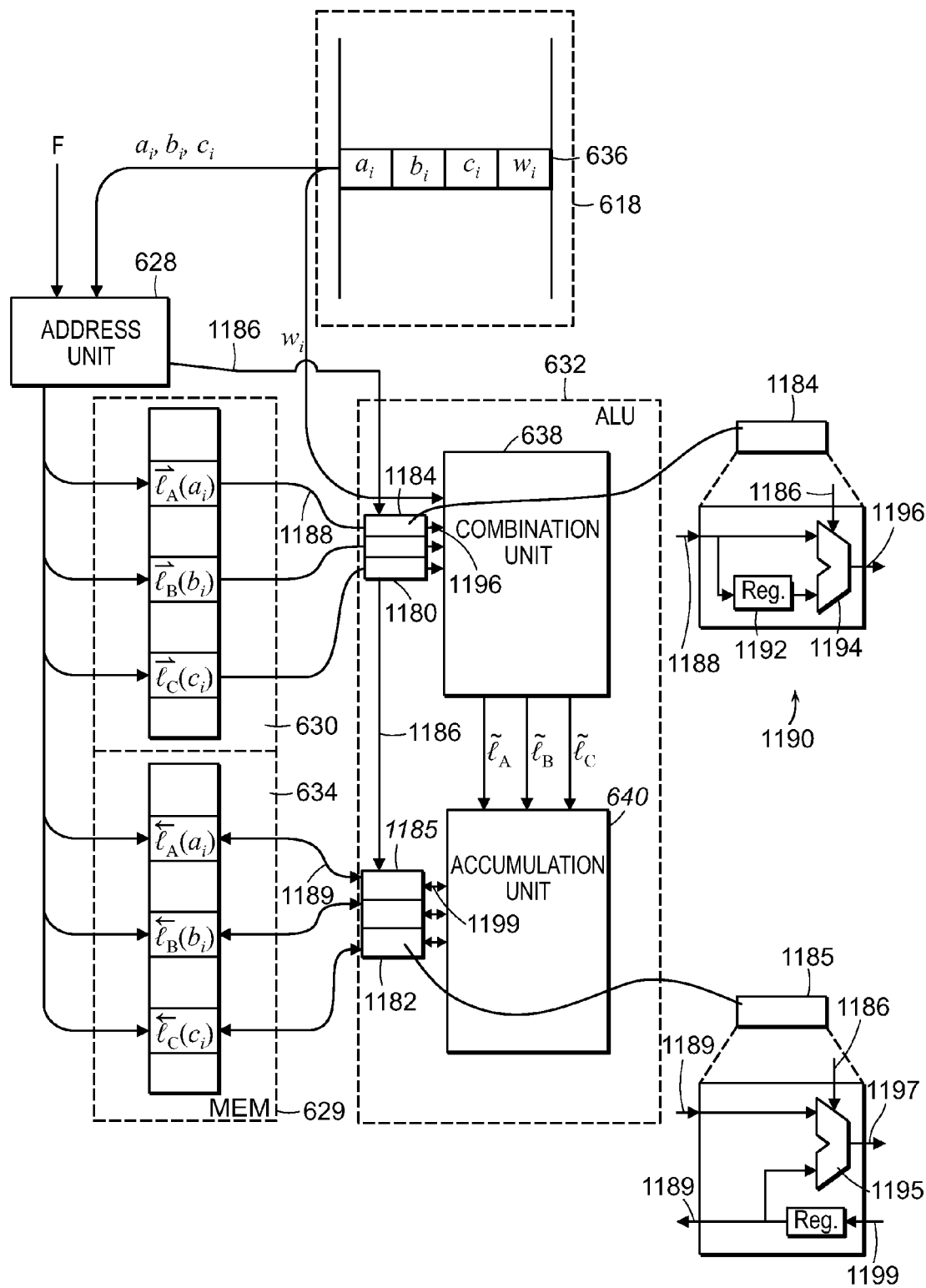
FIG. 11 is a is a block diagram of a computation unit with cache units.

Referring to FIG. 11, to implement an alternative canonical ordering of the weights such as a Gray Code, a caching mechanism may be added to slice architecture of FIG. 6. Such a caching mechanism serves to store the input and output message values read from the message memories 629, 630 from one slice iteration to the next. In this way, if the address of any of the input or output message values repeats from one iteration to the next, that value is not unnecessarily re-read from the message memory.

To implement the caching mechanism, an input message memory cache 1180 and an output message memory cache 1182 are added to the slice architecture. The input message memory cache 1180 is located between the input message memory 630 and the combination unit 638 of the ALU 632 and the output message memory cache 1182 is located between the output message memory 629 and the accumulation unit 640 of the ALU 632.

As is the case in FIG. 6, an address unit 1128 receives a factor, F, and a number of edge indices, A, B, and C as inputs. The address unit 1128 uses its inputs to generate an input memory address and an output memory address for each edge index. The address unit 1128 of FIG. 11 also generates an address changed indicator 1186 for each edge index, each address changed indicator 1186 indicating whether the memory address associated with a given edge index has changed since the previous slice iteration. The address changed indicators 1186 are provided to the input and output message memory caches 1180, 1182.

In general, if the address changed indicator 1186 for a given edge index is false, there is no need to re-read the message value from the message memory address associated with the edge index. Thus, in FIG. 11, it is assumed that no memory read occurs for a given edge index when its corresponding address changed indicator 1186 is false.

The input message memory cache 1180 includes a number of input message caching elements 1184, each corresponding to a single edge index (i.e., A, B, or C).

Referring to a detailed view 1190 of one input message caching element 1184, the input message memory caching element 1184 receives the address changed indicator 1186 associated with its corresponding edge index and outputs an input message value 1196. As is noted above, if the address changed indicator 1186 is true for a given input message caching element 1184, the input message caching element 1184 also receives a newly read input message value 1188 from the input message memory 630. Otherwise, if the address changed indicator 1186 is false for a given input message caching element 1184, the input message caching element 1184 does not receive a newly read input message value from the input message memory 630.

The input message caching element 1184 includes a register 1192 and a multiplexer 1194. The multiplexer 1194 receives the newly read input message value 1188 from the input memory 630 (conditional on the value of the address changed indicator 1184), an input message value from the register 1192, and is controlled by the address changed indicator 1186.

In operation, if the address changed indicator 1186 is true, the input message caching element 1184 stores the newly read input message value 1188 in the register 1192. The multiplexer 1194 is configured by the address changed indicator 1186 such that the newly read message value 1188 is passed to the combination unit 638. Otherwise, if the address changed indicator 1186 is false, the multiplexer 1194 is configured such that the input message value from the previous slice iteration, which is stored in the register 1192, is passed to the combination unit 638. In this way, the input message memory cache 1180 avoids unnecessary reads to the input message memory 630.

The output message memory cache 1182 includes a number of output message caching elements 1185, each corresponding to a single edge index (i.e., $a_i$, $b_i$, or $c_i$).

Referring to the detailed view 1191 of one output message caching element 1185, the output message memory caching element 1184 receives the address changed indicator 1186 associated with its corresponding edge index, and an accumulation result 1199 from the accumulation unit 640. The output message caching element 1185 outputs an output message value 1197 to the accumulation unit 640 and an updated output message value 1199 to the output message memory 629. As is noted above, if the address changed indicator 1186 is true for a given output message caching element 1185, the output message caching element 1185 also receives a newly read output message value 1189 from the output message memory 629. Otherwise, if the address changed indicator 1186 is false for a given output message caching element 1185, the output message caching element 1185 does not receive a newly read input message value from the output message memory 629.

The output message caching element 1185 includes a register 1193 and a multiplexer 1195. The multiplexer 1194 receives the newly read output message value 1189 from the output message memory 629 (conditional on the value of the address changed indicator 1186) and an output message value from the register 1193 and is controlled by the address changed indicator 1186.

In operation, if the address changed indicator 1186 is true, the multiplexer 1195 is configured by the address changed indicator 1186 such that the newly read output message value 1189 is passed to the accumulation unit 640. Otherwise, if the address changed indicator 1186 is false, the multiplexer 1195 is configured such that the accumulation result 1199 from the previous slice iteration, which is stored in the register 1193, is passed to the accumulation unit 640. In both cases, the accumulation unit 640 returns the accumulation result 1199 to the output message caching element 1185 which in turn stores the accumulation result 1199 in the register 1193 and writes the accumulation result 1199 back to the output message memory 629. In this way, the output memory cache 1182 avoids unnecessary reads to the output message memory 629.

Note that caching can have advantages even in the explicit indexing case, and that the order of storage of the weights can affect the utility of the cache. For example, a random ordering of the entries of the factor table would generally result in more non-cached memory accesses than a careful ordering, for example, as a subsequence of the generalized Gray Code ordering described above for the exhaustive format case.

Yet other formats for encoding the factor table can be used. For example, in an exhaustive format approach in which there are runs of zero weights, a run-length coded approach can be used by encoding a starting index and length of run of non-zero weights, which are presented in the canonical order. Alternatively, the runlengths can be encoded by repeating: zero runlength, non-zero runlength, non-zero weights in order. Other forms of run-length encoding may be used, for example based on a compression of an explicit index approach by run-length encoding each entry of a series of index vectors separately. In any of these approaches, indices and run-lengths may be variable-length encoded, for instance, being entropy coded (e.g., Huffman coded) to further compress the representation.

4.2 Alternative Architecture

Figure 12:
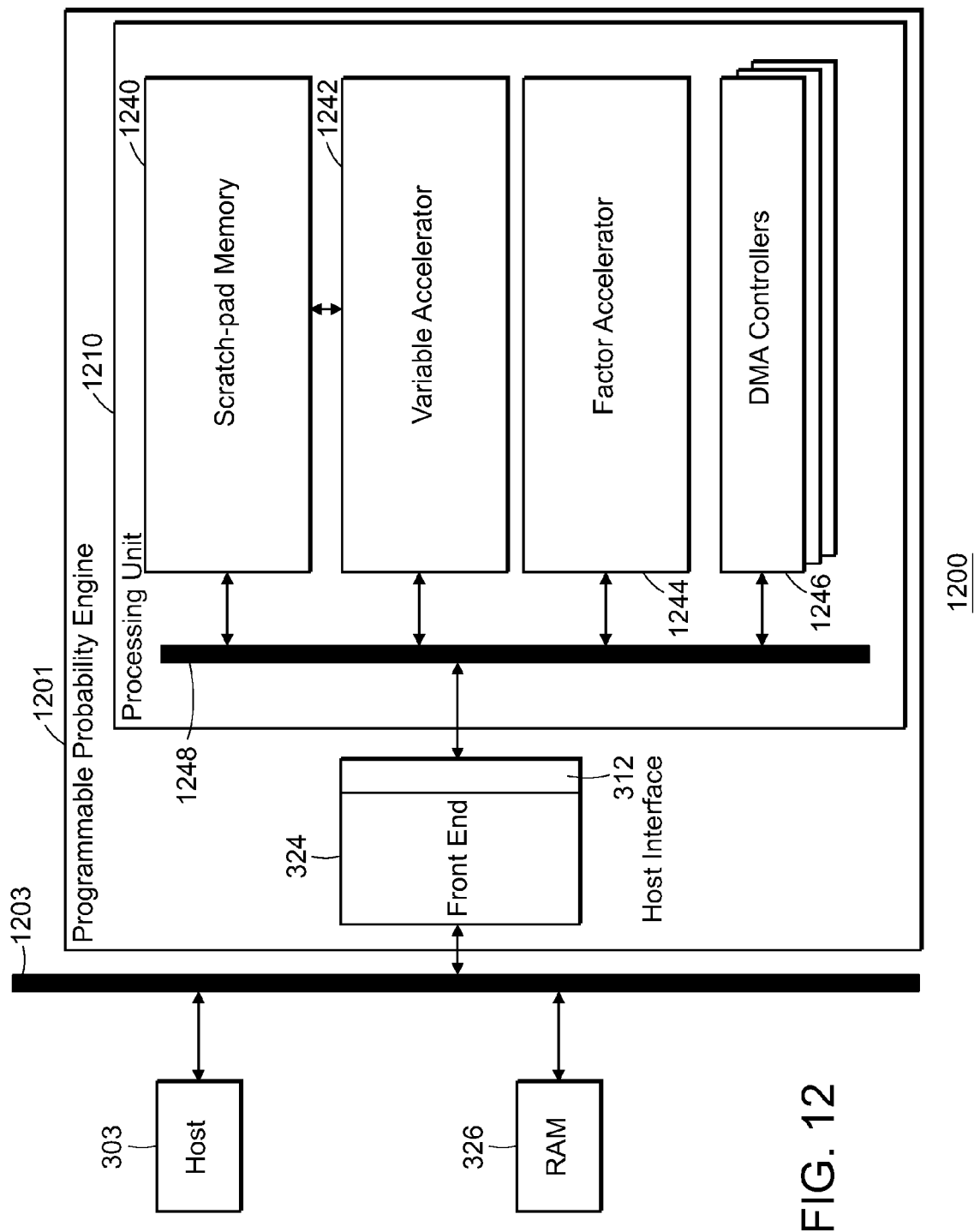
FIG. 12 is a system including a probability processing element which includes a variable accelerator.

Referring to FIG. 12, another embodiment of a reconfigurable processing system 1200 includes a host 303, RAM 326, and a programmable probability engine 1201, all in communication over a bus 1203. The programmable probability engine 1201 includes a front end 324 including a host interface 312 which facilitates communication between the bus 1203 and a processing unit 1210. The processing unit 1210 includes a scratch-pad memory 1240, a variable accelerator 1242, a factor accelerator 1244, and a number of DMA controllers 1246. A system bus 1248 connects all of the elements in the processing unit 1210 to one another and to the host interface 312.

In general, the overall system 1200 functions similarly to the system of FIG. 3. However, rather than handling both variable node computations and factor node computations in the probability processor element 311 shown in FIG. 3, the processing unit performs variable node computations in the variable accelerator 1242. Factor node computations are performed in the factor accelerator 1244 which is substantially the same as the probability processor element 311 shown in FIG. 3.

4.2.1 Variable Accelerator

Figure 13:
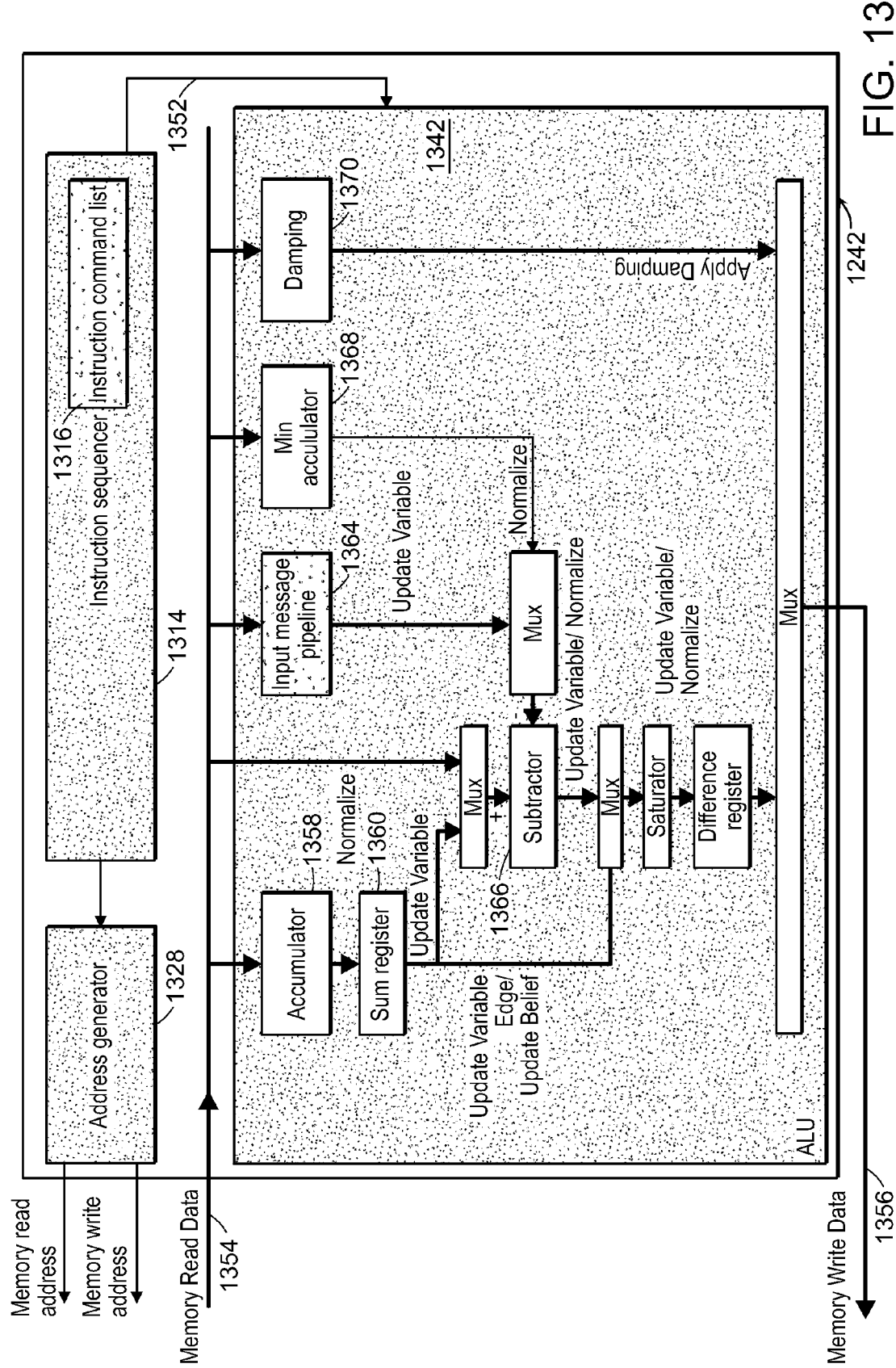
FIG. 13 is a block diagram of a variable accelerator.

Referring to FIG. 13, one example of a variable accelerator 1242 reads data from the scratch pad memory (FIG. 12, element 1240), processes the read data and writes the processed read data back to the scratch pad memory 1240.

The variable accelerator 1242 includes an address generator 1328, an instruction sequencer 1314, and an ALU 1342. The instruction sequencer 1314 includes an instruction command list 1316 which includes a list of instructions to be performed by the variable accelerator 1242. The instruction sequencer 1314 reads an instruction 1352 from the instruction command list 1316 and based on the instruction 1352, commands the address generator 1328 to generate the read and write addresses corresponding to the instruction 1352. The instruction sequencer 1314 also provides the instruction 1352 to the ALU 1342.

The ALU 1342 receives the instruction 1352 from the instruction sequencer 1314 and input data 1354 from the scratch pad memory 1240 and corresponding to the instruction 1352. The ALU processes the input data 1354 according to the instruction 1352 to form write data 1356 which is output to the scratch pad memory 1240. In some examples, the ALU 1342 is configured to perform operations according to an instruction set including the instructions: UpdateVariable, UpdateVariableEdge, VariableBelief, Normalize, and ApplyDamping.

4.2.1.1 UpdateVariable Instruction

The UpdateVariable instruction causes the ALU to compute all output messages for a variable of a factor graph. For example, if a given variable is connected to N factors, the variable receives a set of N input messages (i.e., $f_0$-$f_{N-1}$) from the connected factors. Each message includes a vector with a number of elements equal to the domain length of the variable (i.e., the number of values that the variable can possibly take).

Updating the variable involves computing the following function for each of the connected factors:

$$v_i(x) = \sum_{\substack{j=0 \\ j \neq i}}^{N-1} f_j(x)$$

Where $v_i$ is an output message intended for the $i^{th}$ factor connected to the variable and includes a vector of X elements, with each element addressed as $v_i(x)$. The equation above updates the variable by performing a vector element-by-vector element sum of all of the input message vectors ($f_0$-$f_{N-1}$), excluding the $i^{th}$ input message vector.

In FIG. 13, when the Update Variable instruction is received by the ALU 1342, output messages are computed for all factor nodes connected to the variable node. For the $i^{th}$ factor node of the N connected factor nodes, an accumulator 1358 receives the input message vectors $f_0$-$f_{N-1}$ from the scratch pad memory 1240 and computes a vector element-by-vector element sum all of the input message vectors. The result of the accumulator 1350, v, is a vector of X elements which is stored in a sum register 1360.

At approximately the same time, an input message pipeline 1364 receives the input message associated with the $i^{th}$ factor node, $f_i$. $f_i$ and v are passed to a subtractor 1366 which performs a vector element-by-vector element subtraction of $f_i$ from v, resulting in the output message for the $i^{th}$ factor node, $v_i$. $v_i$ is then passed out of the ALU 1342 as write data 1356 and written to the scratch pad memory 1240.

4.2.1.2 Normalize Instruction

The Normalize instruction causes the ALU to apply (i.e., to add in the negative logarithm representation, or multiply in a linear representation) a constant offset value to all elements of a message vector. In some examples, such an operation is useful when the values included in the message vector are in the log domain. In particular, a normalization operation can keep values included in the message vector within a specific numeric range (e.g., a range suitable for representation using a certain number of bits) as the computation of a factor graph progresses.

In general, the smallest value (i.e., the smallest negative logarithm corresponding to the largest linear representation) in a message vector represents the most likely configuration of a variable. Thus, the message can be normalized by identifying the minimum value in the message vector and adding a value to the entire vector such that the minimum value is at a predefined constant value.

In FIG. 13, a min accumulator 1368 identifies the minimum value of the input message vector associated with the $i^{th}$ factor node, $f_i$. If the identified minimum value is less than a previously identified minimum value, then the identified minimum value is passed to the subtractor 1366. Otherwise, the previously identified minimum value is passed to the subtractor 1366. The subtractor 1366 applies the minimum value to normalize its resulting message output.

4.2.1.3 UpdateVariableEdge

The UpdateVariableEdge instruction causes the ALU 1342 to compute an output message for a single factor connected to the variable. Computation for the single factor is performed in much the same way as is described above for the Update Variable command. However, for the UpdateVariableEdge instruction, the ALU 1342 computes an output message for only one factor and not for all factors.

4.2.1.4 VariableBelief Instruction

The VariableBelief instruction causes the ALU 1342 to compute the belief for the variable based on all of the input message vectors $f_0$-$f_{N-1}$. In some examples this is also referred to as the mean-field variable update computation.

Computing the variable belief involves computing the following function for each of the connected factors:

$$v_i(x) = \sum_{j=0}^{N-1} f_j(x)$$

Where $v_i$ is an output message intended for the $i^{th}$ factor connected to the variable and includes a vector of X elements, with each element addressed as $v_i(x)$. The equation above updates the variable by performing a vector element-by-vector element sum of all of the input message vectors ($f_0$-$f_N$).

In FIG. 13, when the VariableBelief instruction is received by the ALU 1342, output messages are computed for all factor nodes connected to the variable node. For the $i^{th}$ factor node of the N connected factor nodes, the accumulator 1358 receives the input message vectors $f_0$-$f_N$ from the scratch pad memory 1240 and computes a vector element-by-vector element sum all of the input message vectors. The result of the accumulator 1350, v, is a vector of X elements which is stored in a sum register 1360. v is then passed out of the ALU 1342 as write data 1356 and written to the scratch pad memory 1240.

4.2.1.5 ApplyDamping Instruction

The ApplyDamping instruction causes the ALU 1342 to modify an output message vector using a combination of that message vector with a second message vector representing an earlier value of that message vector. The amount of damping applied can be controlled by a predetermined damping coefficient which, in some examples, is a value between 0 and 1.

In FIG. 13, the damping operation is performed by a damping module 1370.

4.3 Simplified Min*

In the ALU described above with reference to FIG. 7, negative logarithm representations are used, and therefore the sums correspond to products in the linear domain, and the min( ) operation corresponds to a max( ) in the linear domain.

In some examples, other functions than min( ) can be used, for example, with hardware circuitry providing efficient implementations of those functions. Note that if two inputs x and y are negative log representations (e.g., using base two logarithms) of two linear quantities, then s being the negative log representation of their sum satisfies $2^{-s}=2^{-x}+2^{-y}$ or $s=-\log_2(2^{-x}+2^{-y})$. In some alternatives, the ALU exactly or approximately computes s rather than using min(x, y). A number of such approximations are referred to generally as min*( ) functions, which can also be implemented in the logic of the ALU.

Note that when x and y are very different min*(x, y)≈min(x, y). Where x and y are similar in value, the result is smaller than the minimum of the two.

In some examples, the min*( ) operation is implemented by performing approximate implementations of the exponentiation and log functions in the equation above. One approach is to implement the min*( ) using the following identity, and using the a table lookup to the second term:

$$\min{}^*(x,y)=\min(x,y)-\log_2(1+2^{\min(x,y)-\max(x,y)})$$

In another approach computing an approximation min*( ), the negative logarithms are treated as having two parts, with the high order bits being treated as as an exponent and the low order bits being treated as a mantissa of a floating point representation, such that $x=x_e\|x_m$ where $\|$ represents bit concatenation, and $y=y_e\|Y_m$, and the result is represented as $\min{}^*(x,y)=s_e\|s_m$. In this approximation $s_e=\min(x_e,y_e)$. If x<y with x=y−d, then $s_e=x_e$ and the "mantissa" is essentially computed as $1\|\bar{s}_m=(1\|\bar{x}_m)+((1\|\bar{y}_m)>>d)$, where the overbar denotes bit complement and in some cases, there is a further renormalization if there is carry in the sum, in a manner similar to that used in floating point addition. Similarly if x>y with x=y+d, then $s_e=y_e$ and the "mantissa" is essentially computed as $1\|\bar{s}_m=((1\|\bar{x}_m)>>d)+(1\|\bar{y}_m)$. In practice, there may be a further renormalization if there is carry in the sum, in a manner similar to that used in floating point addition (i.e., by reducing $s_e$ by one and shifting $s_m$ to the right).

4.4 Compiler/Synchronization Mechanism

The reconfigurable processing system architectures described above include a number of elements operating and in particular, accessing memory, asynchronously. For example, the DMA controllers, variable accelerator, and factor accelerator do not necessarily operate synchronously with each other. Thus, there is a potential for memory access collisions possibly resulting memory corruption. In some examples, a synchronization mechanism uses information embedded in instructions and/or residing in synchronization registers to synchronize memory accesses, thereby avoiding collisions and memory corruption.

In some examples, the synchronization mechanism is included in the instruction sequencers described above (i.e., FIG. 3 element 314 and FIG. 13 element 1314). The instruction sequencers generally run in a continuous loop waiting to read instructions, load their corresponding configuration registers, and to initiate instruction execution. The instruction sequencers including the synchronization mechanism are configured to detect a hold condition before executing an instruction.

In some examples, before beginning execution of a loaded instruction, the instruction sequencer determines if a hold condition is met. If not, the execution begins immediately. However, if the hold condition is met, the instruction sequencer waits to begin execution. The instruction sequencer continuously monitors the hold condition, and as soon as it is no longer met, execution of the instruction commences.

In some examples, the hold condition is considered met based on a result of comparing a sequence number included in the instruction to a hold indication register which is maintained by the host. In other examples, an instruction includes information related to the execution state of other instruction sequencers in the system. The information can be used to hold processing until the other instructions sequencers are at a certain execution state (e.g., causing the instruction sequencers to rendezvous at a given execution state).

In general, the hold condition only applies to the execution of an instruction an not to the loading of the configuration registers for an instruction. Regardless of whether or not the hold condition has been met, loading of the configuration registers for an instruction proceeds unconditionally.

4.5 Miscellaneous

While the above-described reconfigurable processing system architecture utilizes an external host processor to coordinate the programmable probability engine computation and to perform any additional processing beyond the capabilities of the programmable probability engine as currently defined, a more general architecture could include one or more general purpose processors, dedicated to the programmable probability engine. In addition, to simply performing more local coordination of the programmable probability engine's operation and reducing off-chip I/O, local general purpose processors can facilitate support for a broader class of inference algorithms. Some specific algorithms, and the means by which a general purpose processor can augment the computation by the probability processor elements, are described as follows.

In the examples described above, the host system is external to the programmable probability engine. However, in some examples, one or more CPUs may be integrated into the programmable probability engine, acting as an on-chip host system. Furthermore, in some examples, one host system can serve as a host to multiple programmable probability engines.

Particle belief propagation is a form of belief propagation that can be used to support continuous variables or variables with very large domains. In this case, instead of passing an entire probability distribution as a message, the messages are a series of values that represent the importance-weighted message at points randomly sampled from the domain of the variable. The belief propagation updates using these messages are similar to ordinary belief propagation, and as such could be performed using the programmable processor elements with little change. But there are additional aspects of what must be computed that could benefit from support by a general-purpose processor. Specifically, there are two such aspects of the computation. First is the periodic resampling of the randomly chosen sample points for each variable. This computation can involve repeated evaluation of functions that defines factors in the graph (for example, when resampling using the Metropolis-Hastings algorithm). For a user-specified factor-graph, these functions may be user specified and involve arbitrary computation. Second is the regeneration of the factor table after this resampling. One method of doing this is to recalculate the factor-table for a given factor by evaluating its factor function at the new sample points.

This also may involve arbitrary user-specified computation. In both cases, a general purpose processor augmenting the probability processor elements can perform these computations. In one approach, these processors would perform resampling of variables and recalculation of factor tables, and then write the new factor table values into the factor-table memory of the appropriate probability processor element as needed. In one approach, this calculation is performed while a probability processor element continues to perform processing on portions of the factor graph.

Another class of algorithms that could benefit from general purpose computation are sampling-based methods. Common sampling methods are Gibbs sampling and the Metropolis-Hastings algorithm. Sampling based algorithms can be used to perform inference on a factor graph. Typically Gibbs sampling is used in this case (sometimes in combination with the Metropolis-Hastings algorithm). Sampling-based algorithms can also be used to perform inference on models specified by a stochastic generative program. In this case, the Metropolis-Hastings algorithm is used as one aspect of the inference computation. In the case of factor graphs using continuous or large-domain variables, and in the case of stochastic generative programs, inference computation includes performing arbitrary computation based on a user-specified program (either the factor function, in the former case, or the stochastic generative program itself, in the latter case). In both cases, general purpose processors as part of the programmable probability engine can be used to perform these computations. In some cases sampling based methods, such as for performing inference on stochastic generative programs, can be combined with belief propagation, such as performed by the probability processor elements as currently defined. Models that combine both generative programs and undirected graphical models (factor graphs) are possible, and in such cases, it would be appropriate to combine the two approaches, in which case the programmable probability engine belief-propagation computations could operate simultaneously with other computations used for other portions of the model.

Sampling based methods, particle belief propagation, as well as other forms of non-parametric belief propagation (particle belief-propagation is a form of non-parametric belief propagation), all involve random sampling for at least a portion of the computation. Random sampling generally requires mechanisms to generate random or pseudo-random numbers, distributed according to some set of distributions. To efficiently perform these types of computation, one form of probability processor engine would have dedicated hardware for generation of random numbers, or more generally for generating randomly distributed values according to a probability distribution selected among a set of available distributions. Hardware support for this could be a pseudo-random bit-sequence generator, a random bit-sequence generator (based on a form of physical randomness), or could involve direct generation of values from a distribution. Hardware support for uniform distributions, normal distributions, or exponential distributions would facilitate efficient implementation of these algorithms.

For the programmable probability engine including multiple analog processor elements, an alternative embodiment includes direct support for Gaussian messages (parameterized by a mean and variance [or equivalent], or by a joint mean and covariance matrix [or equivalent]). It may also support messages based on mixtures of Gaussians (messages parameterized by a series of Gaussian messages combined with a mixture weight associated with each). It may also support other parameterized message representations. In the case of Gaussian messages, it may support special-purpose processing for Gaussian or linear factors and for variable nodes (linear factors include sum or difference factors, and multiplication by a constant scalar or matrix). For supporting more general factors that are not as easily computed, the programmable probability engine can employ stochastic methods for performing the factor computation. Graphs with such factors would make use of mechanisms similar to those described above for sampling based algorithms, while Gaussian factors, linear factors, and variables, would make use of special-purpose hardware in the probability processor elements.

In the above description some examples of probability processor elements are described as being implemented using analog electronics or a combination of analog and digital logic. However, in some examples, the probability processor elements can be implemented using digital electronics. In an Analog Logic implementation of programmable probability engine, Min-Sum or Sum-Product computations performed by each probability processor element use Analog Logic computation elements. In a digital implementation, this processing uses digital computation elements.

In some examples, the programmable probability engine includes a shared memory for storing factor tables which are shared among a large number of the parallel probability processor elements. In many cases many nodes in a graphical model may use the same factor function. If the associated combination table is sufficiently large, then it would be inefficient to independently store a copy of the table in the local memory of each probability processor element. In this case, it is proposed that a shared memory be available to hold such tables. In operation, all of the probability processor elements making use of a given table in shared memory would be configured to operate in synchrony during the time this table is in use. This allows the data from the table to be read over a shared memory bus and used simultaneously by all probability processor elements that require its value.

The specialized programmable probability engine compiler is responsible for determining the criteria by which shared memory is used to store combo tables. It balances the overall storage requirements with any performance tradeoff associated with reading shared memory or synchronizing probability processor elements. For example, if multiple tables are stored in shared memory that are to be used at the same time by different subsets of probability processor elements, there can be some performance degradation due to contention for the shared memory bus.

In embodiments where at least part of the probability processing engine is implemented using analog electronics, data is converted between digital and analog form. In some examples, a DMA controller included in the front end incorporates a data conversion unit that can translate data between the analog and digital domains. Specifically, the DMA controller can incorporate a bank of DACs for translating data from the digital to the analog domain, and a bank of ADCs for translating data from the analog to the digital domain.

In some examples, each probability processor element includes local operating memory which is maintained by a memory hierarchy scheme, allowing for storage of data at several levels.

The internal representation of messages can be a logarithmic representation of probability; either a log-likelihood ratio (LLR) for binary variables or a potential (log p) for multi-valued variables. By default the corresponding representation of this data for external storage is in the same format. A representation conversion step may also be included to allow representation in other formats.

It is to be understood that the foregoing description is intended to illustrate and not to limit the scope of the invention, which is defined by the scope of the appended claims. Other embodiments are within the scope of the following claims.

What is claimed is:

1. A probability processor configured to perform computations of an inference task specified by a factor graph, the probability processor comprising:
   a factor table memory for storing factor table records of the factor graph; and
   one or more computation units, each computation unit comprising
   an inputs and outputs memory for storing inputs and outputs of a succession of instructions;
   an arithmetic logic unit for (1) performing the succession of the instructions based on factor table records accessed from the factor table memory and the inputs accessed from the inputs and outputs memory and (2) storing the outputs to the inputs and outputs memory; and
   an input message caching element including a register that stores a message value, wherein the input message caching element receives a message value from the inputs and outputs memory, the input message caching element receives an indicator from the factor table memory,
   if the indicator indicates a first logical value, the input message caching element stores the message value in the register and the input message caching element passes the message value to the arithmetic logic unit, and
   if the indicator indicates a second logical value, the input message caching element passes a previous message value to the arithmetic logic unit.

2. The probability processor of claim 1, wherein each computation unit comprises a combination circuit for combining values accessed from the inputs and outputs memory.

3. The probability processor of claim 2, wherein the combination circuit comprises numeric computation logic.

4. The probability processor of claim 2, wherein the combination circuit comprises an analog computation circuit.

5. The probability processor of claim 2, wherein each computation unit further comprises an accumulation circuit for accumulating an output of the combination circuit into values in the inputs and outputs memory.

6. The probability processor of claim 1, wherein the probability processor comprises a plurality of computation units.

7. The probability processor of claim 6, wherein each of the computation units has a separate part of the inputs and outputs memory.

8. The probability processor of claim 6, wherein the factor table memory is shared by the computation units.

9. The probability processor of claim 1, wherein:
   the probability processor is coupled to a controller having an interface for a host system for accepting a specification of at least part of the inference task, and coupled to a plurality of probability processors via a connectivity system;
   the probability processor is configurable by the controller to perform a computation associated with one of a plurality of factors of the factor graph concurrently with one of the plurality of probability processors performing a computation associated with a different one of the plurality of factors; and
   each of the plurality of probability processors exchanges messages via the connectivity system, the messages providing one or more of inputs and outputs to computations on the plurality of factors and providing to the controller a result of performing the part of the inference task.

10. The probability processor of claim 9, wherein the inference task is a graph-based inference task, and each factor is associated with an element of a graph.

11. The probability processor of claim 9, wherein the connectivity system is configured to provide connectivity between probability processors according to the graph.

12. The probability processor of claim 9, wherein the connectivity system provides at least one of a grid, a tree, and a chain connectivity between the probability processors.

13. The probability processor of claim 1, further comprising:
   one or more instruction queues for storing the instructions, wherein the instructions are associated with computations on factors of the factor graph, the probability processor is a chip for accelerated processing, and the probability processor comprises the factor table memory, the one or more instruction queues, and the one or more computation units as on-chip circuitry.

14. A method for performing, in a probability processor, computations of an inference task specified by a factor graph, wherein the probability processor includes a factor table memory and a plurality of computation units, the method comprising:
   storing, in the factor table memory, factor table records of the factor graph;
   performing, by an arithmetic logic unit of each computation unit, a succession of instructions associated with computations on factors of the factor graph using the factor table records and inputs stored in an inputs and outputs memory of the computation unit;
   storing, in the inputs and outputs memory by the arithmetic logic unit of each computation unit, outputs of the succession of instructions;
   receiving, at an input message caching element, a message value from the inputs and outputs memory, the input message caching element including a register that stores a message value; and
   receiving, at the input message caching element, an indicator from the factor table memory, wherein,
   if the indicator indicates a first logical value, the input message caching element stores the message value in the register and the input message caching element passes the message value to the arithmetic logic unit, and
   if the indicator indicates a second logical value, the input message caching element passes a previous message value to the arithmetic logic unit.

15. The method of claim 14, further comprising:
   fetching, by a sequencer of the probability processor from an instruction memory, high level instructions provided by a host system;
   parsing, by the sequencer, the high level instructions into micro-instructions executable by the computation units; and
   providing the micro-instructions to a local instruction sequencer associated with the arithmetic logic unit of each computation unit.

16. The method of claim 15, wherein:
the sequencer is shared by the computation units; and
the performing the succession of instructions comprises each computation unit operating in lock step with one another while operating on distinct data.

17. The method of claim 14, further comprising:
receiving, by an address unit associated with the arithmetic logic unit of each computation unit, an instruction from one or more instruction queues and a factor table record, wherein the address unit provides a mapping between values in the factor table memory and locations in the inputs and outputs memory.

18. The method of claim 14, wherein the performing, the succession of instructions comprises:
accessing a factor table record from the factor table memory;
combining, by a combination unit of the arithmetic logic unit, values in the inputs and outputs memory and a value from the factor table record to generate combined outputs; and
accumulating, by an accumulation unit of the arithmetic logic unit, the combined outputs to generate outputs for storing at the inputs and outputs memory.

19. The method of claim 14, wherein the performing, the succession of instructions comprises:
accessing a factor table record from the factor table memory; and
executing computations on a disjoint subset of the factor table record by the arithmetic logic unit of each computation unit in parallel with each other.

20. The method of claim 19, further comprising:
receiving, by the arithmetic logic units of the computation units, at least a portion of the succession of instructions from a single shared instruction sequencer.

21. The method of claim 19, further comprising:
controlling, by a host system connected to the probability processor via a host interface, operation of the probability processor by loading the factor table memory, configuring a sequencer for coordinating operation of the arithmetic logic units of the computation units and an address unit associated with the arithmetic logic unit of each computation unit, and loading and unloading values for the inputs and outputs memory.

22. The method of claim 14, wherein:
each computation unit has a separate part of the inputs and outputs memory; and
the method further comprises replicating inputs in each of the separate parts of the inputs and outputs memory.

23. The method of claim 14, wherein the performing, the succession of instructions comprises:
executing separate partial computations by the arithmetic logic units of the computation units in parallel; and
combining the separate partial computations across the arithmetic logic units of the computation units.

24. The method of claim 14, further comprising:
accessing, by the arithmetic logic unit of each computation unit, the factor table memory and the inputs and outputs memory over separate signal paths.

25. The method of claim 14, wherein the performing the succession of instructions comprises:
receiving inputs from the inputs and outputs memory by a combination unit of the arithmetic logic unit over a unidirectional signal path.

26. The method of claim 14, wherein the performing the succession of instructions comprises:
reading and writing outputs in or out of the inputs and outputs memory by an accumulation unit of the arithmetic logic unit over a bidirectional signal path.

* * * * *